(12) United States Patent
Tanaka et al.

(10) Patent No.: US 7,409,492 B2
(45) Date of Patent: Aug. 5, 2008

(54) STORAGE SYSTEM USING FLASH MEMORY MODULES LOGICALLY GROUPED FOR WEAR-LEVELING AND RAID

(75) Inventors: Katsuya Tanaka, Kokubunji (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 11/441,192

(22) Filed: May 26, 2006

(65) Prior Publication Data

US 2007/0233931 A1 Oct. 4, 2007

(30) Foreign Application Priority Data

Mar. 29, 2006 (JP) ............................. 2006-092217

(51) Int. Cl.
*G06F 12/16* (2006.01)
(52) U.S. Cl. ........................... 711/103; 711/5; 711/114; 711/115
(58) Field of Classification Search ................. None
See application file for complete search history.

(56) References Cited

U.S. PATENT DOCUMENTS

| | | | | |
|---|---|---|---|---|
| 6,230,233 | B1 * | 5/2001 | Lofgren et al. ............... | 711/103 |
| 7,120,729 | B2 * | 10/2006 | Gonzalez et al. ............. | 711/103 |
| 7,315,917 | B2 * | 1/2008 | Bennett et al. ............... | 711/103 |
| 2004/0083335 | A1 * | 4/2004 | Gonzalez et al. ............. | 711/103 |
| 2005/0114589 | A1 * | 5/2005 | Lofgren et al. ............... | 711/103 |
| 2006/0136655 | A1 * | 6/2006 | Gorobets et al. ............. | 711/103 |
| 2006/0161724 | A1 * | 7/2006 | Bennett et al. ............... | 711/103 |
| 2006/0161728 | A1 * | 7/2006 | Bennett et al. ............... | 711/103 |
| 2007/0083698 | A1 * | 4/2007 | Gonzalez et al. ............. | 711/103 |

FOREIGN PATENT DOCUMENTS

JP 08-016482 6/1994

* cited by examiner

*Primary Examiner*—Kevin Verbrugge
(74) *Attorney, Agent, or Firm*—Reed Smith LLP; Stanley P. Fisher, Esq.; Juan Carlos A. Marquez, Esq.

(57) ABSTRACT

A storage system using flash memories includes a storage controller and plural flash memory modules as storage media. Each flash memory module includes at least one flash memory chip and a memory controller for leveling erase counts of blocks belonging to the flash memory chip. The storage controller combines the plural flash memory modules into a first logical group, translates a first address used for accessing the flash memory modules belonging to the first logical group to a second address used for handling the first address in the storage controller, and combines the plural first logical groups into a second logical group.

31 Claims, 23 Drawing Sheets

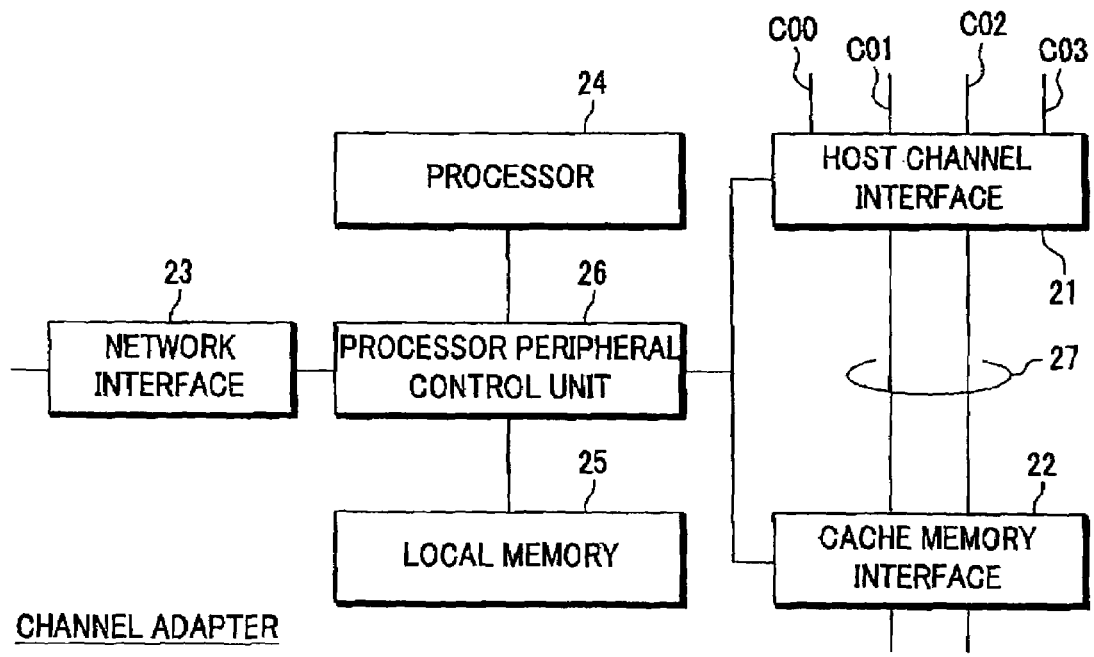
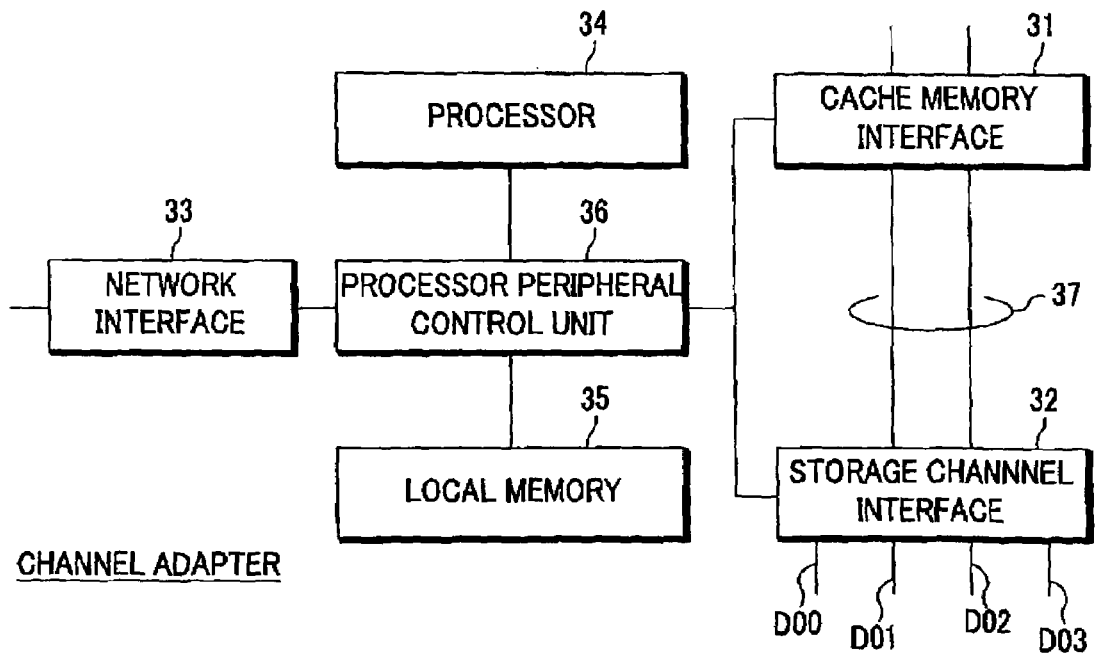

DIFFERENT RAID LEVELS MIXED

FIG.10

| WDEV | VIRTUAL PAGE ADDRESS | DATA LENGTH | PDEV | LOGICAL PAGE ADDRESS | OFFSET | STATUS |
|---|---|---|---|---|---|---|
| W00 | AA0 |  | P00 | AB0 | 0 |  |
|  | AA1 |  | P00 | AB1 | 1 | 1 |
|  | AA2 |  | P00 | AB2 | 0 |  |
|  | AA3 |  | P00 | AB3 | 0 |  |
|  | AA4 |  | P04 | AB0 | 1 |  |
|  | AA5 |  | P04 | AB1 | 1 |  |
|  | AA6 |  | P04 | AB2 | 0 | 1 |
|  | AA7 |  | P04 | AB3 | 1 |  |

FIG.11

| WDEV | VIRTUAL PAGE ADDRESS | DATA LENGTH | PDEV | LOGICAL PAGE ADDRESS | OFFSET | STATUS |
|---|---|---|---|---|---|---|
| W00 | AA0 |  | P00 | AB0 | 0 |  |
|  | AA1 |  | P04 | AB2 | 0 |  |
|  | AA2 |  | P00 | AB2 | 0 |  |
|  | AA3 |  | P00 | AB3 | 0 |  |
|  | AA4 |  | P04 | AB0 | 1 |  |
|  | AA5 |  | P04 | AB1 | 1 |  |
|  | AA6 |  | P00 | AB1 | 0 |  |
|  | AA7 |  | P04 | AB3 | 1 |  |

FIG.12

| PDEV | PDEV CAPACITY | LOGICAL PAGE ADDRESS | TOTAL WRITE SIZE | AVG. ERASE COUNT | AVG. ERASE COUNT (PREVIOUS) | MOVING FLAG |
|---|---|---|---|---|---|---|
| P00 | s00 | AB0 | a000 | e00=f00+(a000 +a001+a002 +a003)/s00 | f00 | 0 |
|  |  | AB1 | a001 |  |  |  |
|  |  | AB2 | a002 |  |  |  |
|  |  | AB3 | a003 |  |  |  |
| P04 | s04 | AB0 | a040 | e04=f04+(a040 +a041+a042 +a043)/s04 | f04 | 0 |
|  |  | AB1 | a041 |  |  |  |
|  |  | AB2 | a042 |  |  |  |
|  |  | AB3 | a043 |  |  |  |

| OFFSET VALUE COMBINATION BEFORE DATA EXCHANGE | | OFFSET VALUE COMBINATION AFTER DATA EXCHANGE | |
|---|---|---|---|
| 0 | 0 | 0 | 1 |
| 0 | 1 | 0 | 0 |
| 1 | 1 | 1 | 0 |

FIG.31

| WDEV | VIRTUAL PAGE ADDRESS | DATA LENGTH | PDEV | LOGICAL PAGE ADDRESS | STATUS |
|---|---|---|---|---|---|
| W00 | AA0 |  | P00 | AC0 |  |
|  | AA1 |  | P00 | AC1 |  |
|  | AA2 |  | P00 | AC2 |  |
|  | AA3 |  | P00 | AC3 |  |
|  | AA4 |  | P04 | AC0 |  |
|  | AA5 |  | P04 | AC1 |  |
|  | AA6 |  | P04 | AC2 |  |
|  | AA7 |  | P04 | AC3 |  |

FIG.32

| WDEV | VIRTUAL PAGE ADDRESS | DATA LENGTH | PDEV | LOGICAL PAGE ADDRESS | STATUS |
|---|---|---|---|---|---|
| W00 | AA0 |  | P00 | AC0 |  |
|  | AA1 |  | P04 | AC4 |  |
|  | AA2 |  | P00 | AC2 |  |
|  | AA3 |  | P00 | AC3 |  |
|  | AA4 |  | P04 | AC0 |  |
|  | AA5 |  | P04 | AC1 |  |
|  | AA6 |  | P00 | AC4 |  |
|  | AA7 |  | P04 | AC3 |  |

| PDEV | LOGICAL PAGE ADDRESS | DATA LENGTH |
|---|---|---|
| P00 | AC4 | |
| P04 | AC4 | |

| PDEV | LOGICAL PAGE ADDRESS | DATA LENGTH |
|---|---|---|
| P00 | AC1 | |
| P04 | AC2 | |

STORAGE SYSTEM USING FLASH MEMORY MODULES LOGICALLY GROUPED FOR WEAR-LEVELING AND RAID

CROSS-REFERENCE TO RELATED APPLICATION

This application claims the benefit of Japanese Patent Application No. 2006-092217 filed on Mar. 29, 2006, the disclosure of which is incorporated herein by reference.

FIELD OF THE INVENTION

The present invention relates to a storage system using flash memories capable of wear-leveling among plural flash memory modules, a wear-leveling method for the storage system, and a wear-leveling program for the storage system.

DESCRIPTION OF THE RELATED ART

A system for storing data (hereinafter referred to as "storage system") generally includes randomly accessible nonvolatile memory media. Randomly accessible nonvolatile memory media includes, for example, a magnetic disk or an optical disk. Recently, a common storage system has many compact disk drives.

As various semiconductor technologies have been more improved, nonvolatile semiconductor memories have been developed, on which data can be erased at a time, such as a flash memory. A flash memory is a semiconductor memory that is a nonvolatile memory serving as a read only memory (ROM), as well as a random access memory (RAM) which is both readable and writable. A storage system having flash memories as storage media is excellent in service life, power-saving and access time, in comparison to a storage system having many small compact disk drives.

An explanation will be herein given on a flash memory.

Usually, data cannot be directly rewritten onto a flash memory due to property thereof. That is, in order to rewrite data onto a flash memory, effective data stored on the flash memory has to be relocated to other place. Then, the stored data is erased on a block by block basis. Thereafter, another data is written in each block where the data has been erased. A block denotes a unit of storage area where data is erased at a time.

In a flash memory, for example, storage area where data has been erased is always set as "1". Therefore, it is possible to rewrite "1" to "0" by binary bit conversion when rewriting data. However, it is impossible to directly rewrite "0" to "1" unless stored data is erased. In order to rewrite data onto a flash memory, an entire block of the flash memory is erased. Accordingly, a flash memory always requires a block erase when data is rewritten onto the flash memory.

A flash memory has limitation of block erase counts. For example, block erase counts are ensured up to 100,000 counts per block. If a specific block experiences excessive erase counts due to intensive data rewriting, it becomes impossible to erase data on the block any more, which causes a problem. Therefore, in a storage system using flash memories as storage media, it is essential to prepare a wear-leveling process to prevent intensive erase counts from occurring on a specific block.

JP-A-8-16482 discloses a wear-leveling method in which a storage system employs a mapping management method for providing flexibility for a block association relationship between a host computer and flash memories to solve a problem that a physical block of a flash memory is selected one-sidedly by a logical block when a computer accesses to the logical block. In this scheme, this conventional storage system manages write counts of each logical block to which the host computer accesses, and erase counts of each physical block that the storage system erases. If there occur a logical block having excessive write counts and a physical block having excessive erase counts; and a logical block having fewer write counts and a physical block having fewer erase counts, a mapping is provided in such a manner that the logical block having excessive write counts is allowed to correspond to the physical block having fewer erase counts, and the logical block having fewer write counts is allowed to correspond to the physical block having excessive erase counts.

Generally, a flash memory module (hereinafter referred to as "PDEV") is constituted by a memory controller and plural flash memory chips, and the memory controller provides a wear-leveling process which is the same as that of the above mentioned conventional scheme. In a large scale storage system, it can be considered that a number of flash memories as storage media are connected with one another to build bulk storage. In this case, each flash memory is provided with wear-leveling by using the controller. However, in a case in which a specific flash memory module experiences intensive rewrite counts, as the flash memory module has more increased erase counts, the module wears out more rapidly. To prevent increase in erase counts on a specific module, it is required to provide wear-leveling among plural flash memory modules.

If the above mentioned wear-leveling scheme is applied to a storage system having a number of flash memories connected therewith, there is a problem that a memory controller in a flash memory module obscures physical blocks in a flash memory chip, which hinders a storage controller in the storage system from managing erase counts of each physical block.

Furthermore, if a conventional wear-leveling scheme is applied over an entire storage system without using a memory controller in a flash memory module, that is, without providing wear-leveling for each flash memory module, the storage system has to integrally manage erase counts of tremendous a number of physical blocks, resulting in increase in management loads and deterioration in performance of the storage system.

In the light of the above problems, it has been requested to provide a storage system using flash memories, which is capable of wear-leveling among plural flash memory modules without using mapping information on physical blocks of flash memories, and provides a wear-leveling method for the storage system and a wear-leveling program for the storage system, as well.

SUMMARY OF THE INVENTION

In one aspect of the present invention, there is provided a storage system using flash memories including a storage controller and plural flash memory modules as storage media. Each flash memory module includes at least one flash memory chip and a memory controller for leveling erase counts of blocks belonging to the flash memory chip. The storage controller combines the plural flash memory modules into a first logical group, translating a first address used for accessing the flash memory modules belonging to the first logical group to a second address used for handling the first address in the storage controller, and combining the plural first logical groups into a second logical group.

In another aspect of the present invention, there is provided a wear-leveling method for a storage system using flash memories including flash memory modules including at least one flash memory chip and a memory controller for leveling erase counts of blocks belonging to the flash memory chip; and a storage controller for combining the flash memory modules into a first logical group, translating a first address used for accessing the flash memory modules belonging to the first logical group to a second address used for handling the first address in the storage controller, and combining a plurality of first logical groups into a second logical group.

The method includes a step of allowing the storage controller to provide count management on write size of each predetermined memory area in the flash memory module; a step of allowing the storage controller to calculate an average erase count yielded by dividing total write size of each flash memory module through a predetermined time period by a capacity of the flash memory module and a first determination step of allowing the storage controller to determine whether or not a difference between a maximum value and a minimum value of the average erase count is not less than a predetermined value. At the first step, if the difference of the erase count is not less than the predetermined value, the method further includes a step of allowing the storage controller to exchange data between memory area having a maximum write size and memory area having a minimum write size, among the flash memory modules having the maximum difference of the erase count, and to change mapping information between the first address and the second address.

In further another aspect of the present invention, there is provided a wear-leveling program for a storage system using flash memories including flash memory modules including at least one flash memory chip and a memory controller for leveling erase counts of blocks belonging to the flash memory chip; and a storage controller for combining the flash memory modules into a first logical group, translating a first address used for accessing the flash memory modules belonging to the first logical group to a second address used for handling the first address in the storage controller, and combining the plural first logical groups into a second logical group.

The program performs a process for allowing a computer to provide count management on write size of each predetermined memory area in the flash memory module; a process for allowing the computer to calculate an average erase count yielded by dividing total write size of each flash memory module through a predetermined time period by capacity of the flash memory module; and a process of a first determination of allowing the computer to determine whether or not a difference between a maximum value and a minimum value of the average erase count is not less than a predetermined value. If the difference is not less than a predetermined value, the program further includes a process for allowing the computer to change mapping information between the first address and the second address.

Other features and advantages of the present invention will become more apparent from the following detailed description of the invention. When taken in conjunction with the accompanying exemplary drawings.

BRIEF DESCRIPTION OF THE DRAWINGS

FIG. 2 is a block diagram showing a configuration of a channel adapter.

FIG. 3 is a block diagram showing a configuration of a storage adapter.

FIG. 10 shows an address translation table between a virtual page address and a logical page address before a data exchange process accompanied by the wear-leveling process according to the embodiment of the present invention.

FIG. 11 shows an address translation table between a virtual page address and a logical page address after the data exchange process accompanied by the wear-leveling process according to the embodiment of the present invention.

FIG. 12 shows an erase count management table for each flash memory module, which is managed in the storage controller.

FIG. 31 is a table for explaining an address translation table between a virtual page address and a logical page address before the data exchange process.

FIG. 32 is a table for explaining the address translation table between the virtual page address and the logical page address after the data exchanging process.

DETAILED DESCRIPTION OF THE PREFERRED EMBODIMENTS

Explanations will be provided hereinafter on an embodiment of the present invention, with reference to drawings.

<Outline>

A storage system using flash memories according to an embodiment of the present invention includes a storage controller and plural flash memory modules as storage media. Each flash memory module (e.g. flash memory module P0) includes at least one flash memory chip (e.g. flash memory chip 405), and a memory controller (e.g. controller MC) for leveling erase counts of blocks (e.g. block 406) belonging to the flash memory chip. The storage controller (e.g. storage controller SC) combines plural flash memory modules into a first logical group (e.g. wear-leveling group W00), and translates a first address (e.g. logical page address 600) used for accessing flash memory modules belonging to the first logical group into a second address (e.g. virtual page address 604) used for handling the first address in the storage controller, and combines plural first logical groups to configure a second logical group (e.g. RAID group).

Figure 1:
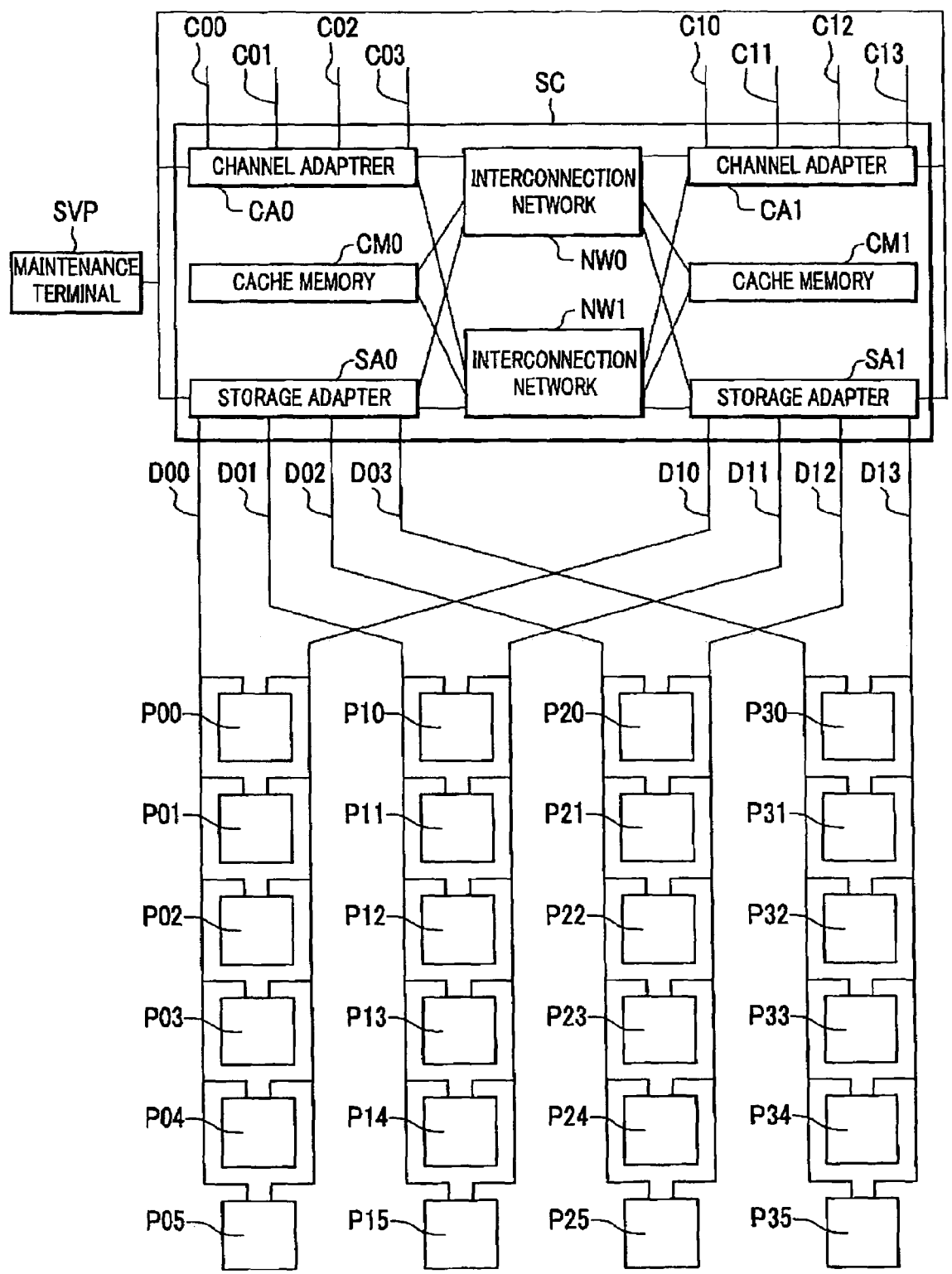
FIG. 1 is a block diagram showing a configuration of a storage system according to an embodiment of the present invention.

FIG. 1 is a block diagram showing a configuration of the storage system according to the present embodiment.

The storage system 100 includes a storage controller SC and flash memory modules P00 to P35.

The storage controller SC includes channel adapters CA0, CA1, cache memories CM0, CM1, storage adapters SA0, SA1, and interconnection networks NW0, NW1. Although the channel adapters CA0, CA1, cache memories CM0, CM1, storage adapters SA0, SA1 are shown in pairs respectively in the drawing, those components are provided not limited to in pairs, but may be provided in numbers.

The interconnection networks NW0, NW1 may be switches, and interconnect devices constituting the storage controller SC. Specifically, the interconnection networks NW0, NW1 interconnect the channel adapter CA0, the cache memory CM0 and the storage adapter SA0. The interconnection networks NW0, NW1 also interconnects the channel adapter CA1, the cache memory CM1 and the storage adapter SA1.

The channel adapter CA0, as shown later in FIG. 2, is connected with an external host system (not shown) via the channels C00, C01, C02, C03. The channel adapter CA1 is connected with an external host system (not shown) via the channels C10, C01, C12, C13. A host system denotes a computer for reading and writing data onto the storage system 100 according to the present embodiment. The storage system 100 connects with a host system or other storage system via Fibre Channel switches, FC-AL (Fibre Channel Arbitrated Loop), SAS (Serial Attached SCSI) Expander, or the like.

The cache memory CM0 temporarily stores data received from the channel adapter CA0 and the storage adapter SA0. The cache memory CM1 temporarily stores data received from the channel adapter CA1 and the storage adapter SA1.

The storage adapter SA0 is connected with a flash memory module P00, etc. (described later in FIG. 3). Specifically, the storage adapter SA0 is connected with flash memory modules P00 to P05 via a channel D00. The storage adapter SA0 is also connected with flash memory modules P10 to P15 via a channel D01. The storage adapter SA0 is further connected with flash memory modules P20 to P25 via a channel D02. Furthermore, the storage adapter SA0 is connected with flash memory modules P30 to P35 via a channel D03.

The storage adapter SA1 is connected with flash memory module P00, etc. Specifically, the storage adapter SA1 is connected with flash memory modules P00 to P05 via a channel D10. The storage adapter SA1 is also connected with flash memory modules P10 to P15 via a channel D11. The storage adapter SA1 is further connected with flash memory modules P20 to P25 via a channel D12. Furthermore, the storage adapter SA1 is connected with flash memory modules P30 to P35 via a channel D13. Specifically, the storage adapters and the flash memories modules are connected with each other via Fibre Channel switches, FC-AL, SAS Expander, or the like.

The channel adapters CA0, CA1 and the storage adapters SA0, SA1 are connected with a maintenance terminal SVP. The maintenance terminal SVP sends setting information inputted by an administrator of the storage system 100 to the channel adapters CA0, CA1 and/or the storage adapters SA0, SA1. The storage system 100 may be equipped with a single adapter instead of using the storage adapter SA0 and the channel adapter CA0. In this case, this single adapter performs a process to be performed by the storage adapter SA0 and the channel adapter CA0.

FIG. 2 is a block diagram showing a configuration of the channel adapter. The channel adapter CA0 includes a host channel interface 21, a cache memory interface 22, a network interface 23, a processor 24, a local memory 25 and a processor peripheral control unit 26.

The host channel interface 21 is connected with an external host system (not shown) via the channels C00, C01, C02, C03. The host channel interface 21 inter-converts data transfer protocol on the channels C00, C01, C02, C03 to data transfer protocol inside the storage controller SC The cache memory interface 22 is connected with interconnection networks NW0, NW1. The network interface 23 is connected with the maintenance terminal SVP. The host channel interface 21 and the cache memory interface 22 connect with each other via signal lines 27.

The processor 24 performs various processes by executing each of the programs stored on a local memory 25. Specifically, the processor 24 controls data transfer between a host system and the interconnection networks NW0, NW1.

The local memory 25 stores the programs executed by the processor 24. The local memory 25 stores tables to be looked up by the processor 24. The tables may be set or changed by the administrator.

In this case, the administrator inputs information on setting or change of the table. The maintenance terminal SVP sends the information inputted by the administrator to the processor 24 via the network interface 23. The processor 24 generates or changes a table based on the received information. Then, the processor 24 stores the table on the local memory 25.

The processor peripheral control unit 26 controls data transfer among the host interface channel 21, the cache memory interface 22, the network interface 23, the processor 24 and the local memory 25. The processor peripheral control unit 26 is, for example, a chipset or the like. The channel adapter CA1 has the same configuration as that of the channel adapter CA0. Therefore an explanation on the channel adapter CA1 will be omitted herein.

FIG. 3 is a block diagram showing the storage adapter according to the present embodiment. The storage adapter SA0 includes a cache memory interface 31, a storage channel interface 32, a network interface 33, a processor 34, a local memory 35 and a processor peripheral control unit 36.

The cache memory interface 31 is connected with the interconnection networks NW0, NW1. The storage channel interface 32 is connected with channels D00, D01, D02, D03. The storage channel interface 32 inter-converts a data transfer protocol on the channels D00, D01 D02, D03 and a data transfer protocol inside the storage controller SC to each other. The cache memory interface 31 and the storage channel interface 32 are connected with each other via the signal lines 37. The network interface 33 is connected with a maintenance terminal SVP.

The processor 34 performs various processes by executing each program stored on the local memory 35.

The local memory 35 stores the programs to be executed by the processor 34. The local memory 35 stores tables to be looked up by the processor 34, as well. The tables may be set or changed by the administrator.

In this case, the administrator inputs information on setting or change of the tables into the maintenance terminal SVP. The maintenance terminal SVP sends the processor 34 the information inputted by the administrator via the network interface 33. The processor 34 generates or changes the tables based on the received information. Then, the processor 34 stores the table onto the local memory 35.

The processor peripheral control unit 36 controls data transfer among the cache memory interface 31, the storage channel interface 32, the network interface 33, the processor 34 and the local memory 35. The processor peripheral control unit 36 may be a chipset or the like. The storage adapter SA1 has the same configuration as that of the storage adapter SA0. Therefore an explanation on the storage adapter SA1 will be omitted herein.

Figure 4:
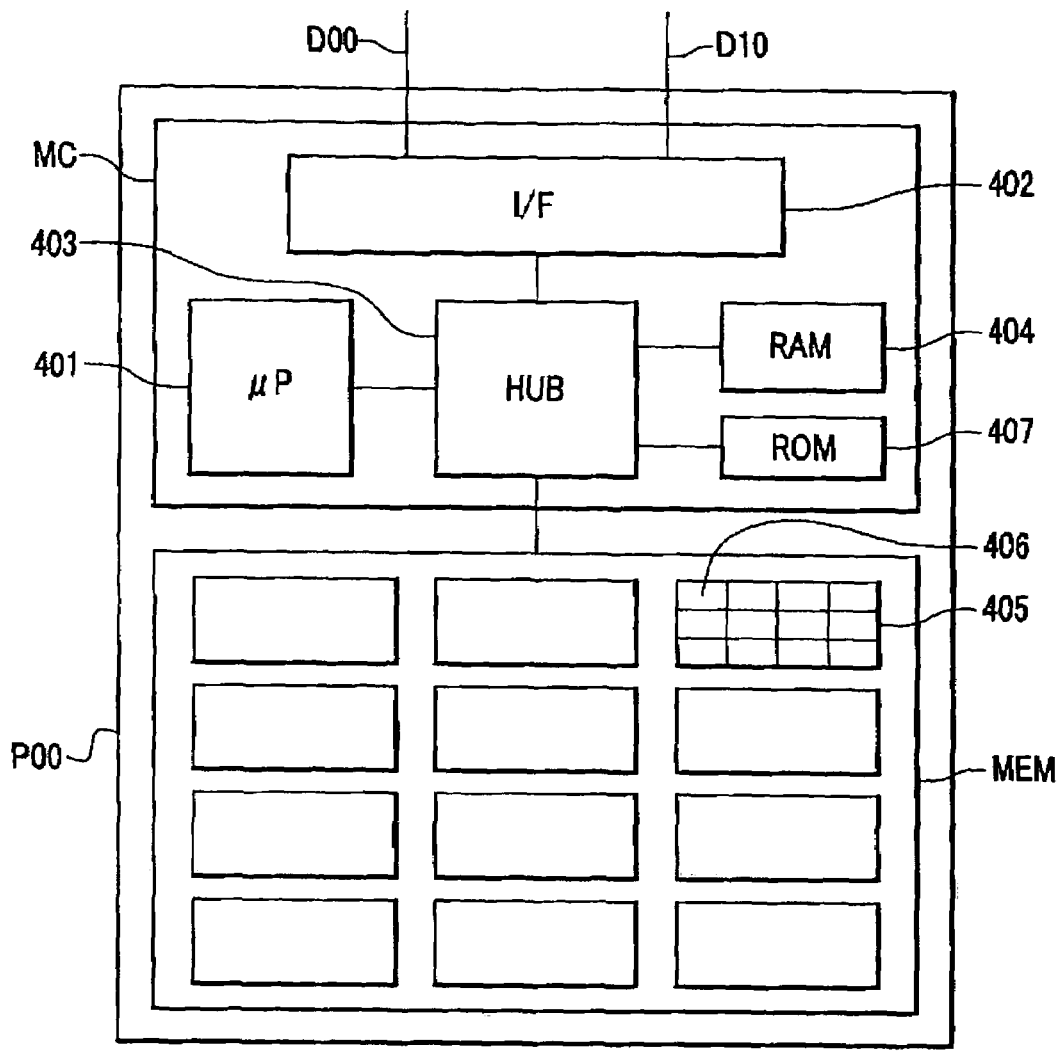
FIG. 4 is a block diagram showing a configuration of a flash memory module.

FIG. 4 is a block diagram showing a configuration of a flash memory module according to the present invention. A flash memory module P00 includes a memory controller MC and a flash memory MEM. The flash memory MEM stores data. The memory controller MC reads/writes or erases the data stored on the flash memory MEM.

The memory controller MC includes a processor (µP) 401, an interface unit (I/F) 402, a data transfer unit (HUB) 403, a memory (RAM) 404 and a memory (ROM) 407.

The flash memory MEM includes plural flash memory chips 405. Each flash memory chip 405 includes plural blocks 406 to store data thereon. Each block 406 is a unit by which the memory controller MC erases data, as described later in FIG. 5.

The block 406 includes plural pages. A page is a unit by which the memory controller MC reads/writes data, as described later in FIG. 5. Every page is categorized either in a valid page, an invalid page, an unused page, or a bad page. A valid page is a page storing valid data. An invalid page is a page storing invalid data. An unused page is a page storing no data. A bad page is a page physically unavailable, for example, because the page contains broken storage elements.

The interface unit 402 is connected with the storage adapter SA0 in the storage controller SC via the channel D00. The interface unit 402 is also connected with the storage adapter SA1 in the storage controller SC via the channel D10.

The interface unit 402 receives instructions from the storage adapter SA0 and the storage adapter SA1. Instructions from the storage adapter SA0 and the storage adapter SA1 are such as SCSI commands.

Specifically, the interface unit 402 receives data from the storage adapter SA0 and the storage adapter SA1. Then the interface unit 402 stores the received data onto the memory 404.

The interface unit 402 also sends the data stored on the memory 404 to the storage adapter SA0 and the storage adapter SA1.

The memory 404 is, for example, a dynamic RAM memory which can read/write data at high speed. The memory 404 temporarily stores data that is sent or received by the interface unit 402. The memory 407 is a nonvolatile memory for storing programs to be executed by the processor 401. When flash memory module P00 is activated, the program is copied from the memory 407 onto the memory 404 so that the processor 401 can execute the program. The memory 404 stores the tables to be looked up by the processor 401. The tables may include, for example, an address translation table between a logical page address and a physical page address of the flash memory MEM. The logical page address is an address for use when accessing from outside a flash memory module (for example, from the storage adapter SA0) to a page as a unit by which data is read/written onto a flash memory. A physical page address is an address for use when the memory controller MC accesses to a page serving as a unit by which data is read/written onto a flash memory.

The data transfer unit 403 may be, for example, a switch for interconnecting a processor 401, an interface unit 402, a memory 404, a memory 407 and a flash memory MEM, and controls data transfer among these components.

The processor 401 performs various processes by executing each of the programs stored on the memory 404. For example, the processor 401 looks up an address translation table between the logical page address and the physical page address of a flash memory, which is stored on the memory 404, and then reads/writes data onto the flash memory MEM based on the table. The processor 401 provides a reclamation process (block reclamation process) and a wear-leveling process for the block 406 in the flash memory module.

The reclamation process (block reclamation process) is a process to rebuild an invalid page in the block 406 into an unused page, so that a block having fewer unused pages can be rebuilt to be available again. It is assumed herein that the block 406 to be a target for the reclamation process includes valid pages, invalid pages and unused pages, and many of them are invalid pages. In this case, it is required to erase invalid pages in order to increase unused pages. However, an erasing process can be done not on a page by page basis, but on a block by block basis. Therefore, it is required to rebuild a block to be available in such a manner that a valid page of a target block is copied onto an empty block, and then a target block is erased. Specifically, the processor 401 copies data stored on a valid page in the block 406 that is targeted for the reclamation process (i.e. target block) onto an unused block. The processor 401 changes a logical block number of the unused block on which data has been copied to a logical block number of the target block. Then, all the data on the target block is erased, whereby the reclamation process is completed.

For example, as the processor 401 writes more data onto the block 406, more unused pages in the block 406 are decreased. Then, if the block 406 becomes in short of unused pages, the processor 401 cannot write data onto the block 406 any more. Therefore, the processor 401 reclaims an invalid page into an unused page by performing the reclamation process on the block 406.

The wear-leveling process is a process for leveling erase counts of the block 406, whereby the flash memory MEM endurance can be increased. The more data erase counts a flash memory MEM experiences, the faster the flash memory MEM reaches endurance thereof eventually. The flash memory MEM endurance is usually assured up to 10,000 to 100,000 counts.

Now, other flash memory modules P01 to P35 have the same configuration as that of the flash memory module P00. Therefore, an explanation of these modules P01 to P35 will be omitted.

Figure 5:
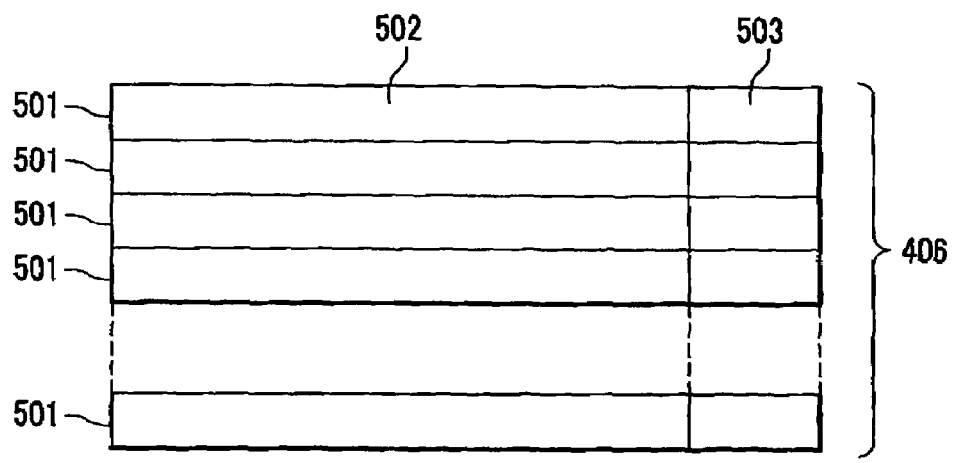
FIG. 5 is a diagram showing a structure of a block of the flash memory module.

FIG. 5 is a diagram showing a structure of a block of a flash memory module. The block 406 of the flash memory module P00 includes plural pages 501. The block 406 usually includes several ten pages 501 (e.g. 32 pages, 64 pages).

Each page 501 is a unit by which the memory controller MC or the like reads/writes data. For example, in a NAND-type flash memory, the memory controller MC or the like reads data at speed of 20 to 30 μs or less/page, and writes data at speed of 0.2 to 0.3 ms/page. The memory controller MC or the like erases data at speed of 2 to 4 ms/block.

The page 501 includes a data section 502 and a redundant section 503. The data section 502 may comprise 512 bytes, and the redundant section 503 may comprise 16 bytes, for example. The data section 502 stores ordinal data.

The redundant section 503 stores management information and an error correction code about the page 501. The management information includes offset addresses and page statuses. The offset address is a relative address in the block 406 to which the page 501 belongs. The page status shows whether the page 501 is a valid page, an invalid page, an unused page, or a page under being processed. The error correction code is a code to detect and correct an error on the page 501, such as Humming code.

Figure 6:
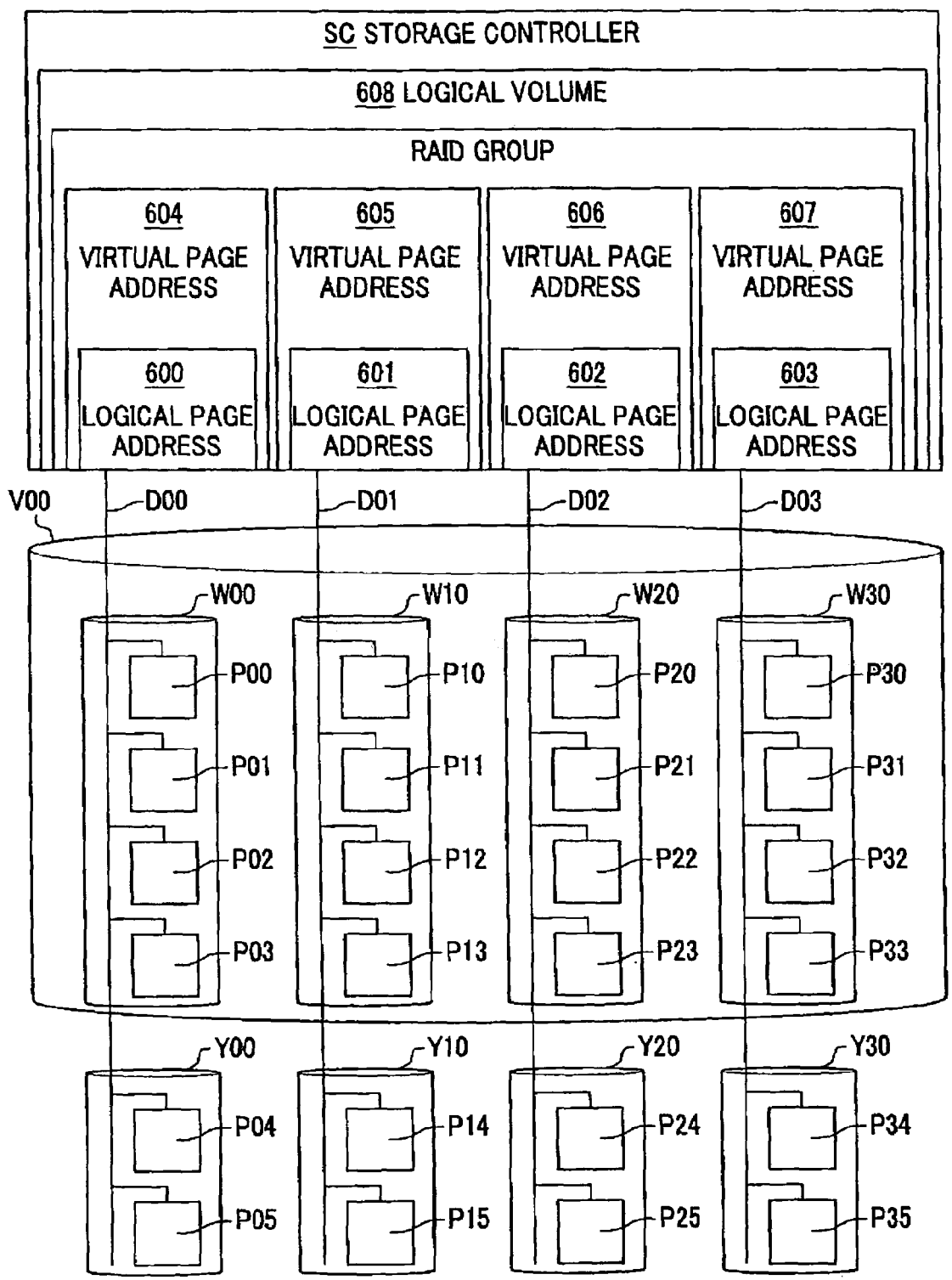
FIG. 6 is a block diagram showing a structure of logical groups and hierarchy of address translation of the storage system according to the embodiment of the present invention.

FIG. 6 is a block diagram showing a structure of logical groups and a hierarchy of address translation. The storage system in FIG. 6 has the same hardware configuration as that of the storage system in FIG. 1. For the convenience, only the channels D00, D01, D02, D03 are shown, as the channels of the storage controller SC which connects with the flash memory modules P00 to P35, and the channels D10, D11, D12, D13 are omitted in the drawing.

In the storage system 100 according to the present embodiment, flash memory modules connected with one another on a same channel constitutes a wear-leveling group (WDEV). For example, the flash memory modules P00 to P03 on the channel D00 constitutes a wear-leveling group W00. Similarly, the flash memory modules P10 to P13 on the channel D01 constitutes a wear-leveling group W10; the flash memory modules P20 to P23 on the channel D02 constitutes a wear-leveling group W20; and the flash memory modules P30 and P33 on the channel D03 constitutes a wear-leveling group W30.

Each flash memory module can be accessed via a corresponding logical page address thereof from the storage controller SC. For example, the flash memory modules P00 to P03 on the channel D00 can be accessed via each corresponding logical page address 600 of the modules. Similarly, the flash memory modules P10 to P13 on the channel D01 can be accessed via each corresponding logical page address 601 of the modules; the flash memory modules P20 to P23 on the channel D02 can be accessed via each corresponding logical page address 602 of the modules; and the flash memory modules P30 to P33 on the channel D03 can be accessed via each corresponding logical page address 603 of the modules.

The storage controller SC puts plural logical page addresses of flash memory modules belonging to a same wear-leveling group together into a group and translates the group into a single virtual page address. For example, the storage controller SC puts the logical page addresses 600 of the flash memory modules P00 to P03 belonging to the wear-leveling group W00 together, and translates the group into a virtual page address 604. Similarly, the logical page addresses 601 of the flash memory modules P10 to P13 belonging to a wear-leveling group W10 are put together and translated into a virtual page address 605; the logical page addresses 602 of the flash memory modules P20 to P23 belonging to a wear-leveling group W20 are put together and translated into a virtual page address 606; and the logical page addresses 603 of the flash memory modules P30 to P33 belonging to a wear-leveling group W30 are put together and translated into a virtual page address 607.

As described above, the storage controller SC translates a logical page address into a virtual page address. In this way, even if data is transferred between flash memory modules for the sake of wear-leveling and a related logical page address is changed, the storage controller SC that is a higher-level device can change a mapping between a logical page address and a virtual page address corresponding to the logical address, so that data can be accessed with no conflicts.

In the storage system 100 according to the present embodiment, plural wear-leveling groups are combined so as to constitute a single RAID group (VDEV). In FIG. 6, four wear-leveling groups W00 to W30 are combined into a RAID group V00. Each virtual page address page area in each of the wear-leveling groups constituting a single RAID group has the same storage capacity. Areas in one or more RAID groups are combined into a single logical volume 608, which is memory area that the storage controller SC shows to a host system.

Flash memory modules P04, P05 on the channel D00 constitute a spare group (YDEV) Y00. Similarly, flash memory modules P14, P15 on the channel D01 constitute a spare group Y10; flash memory modules P24, P25 on the channel D02 constitute a spare group Y20; and flash memory modules P34, P35 on the channel D03 constitute a spare group Y30. How to replace modules will be described later.

Figure 7:
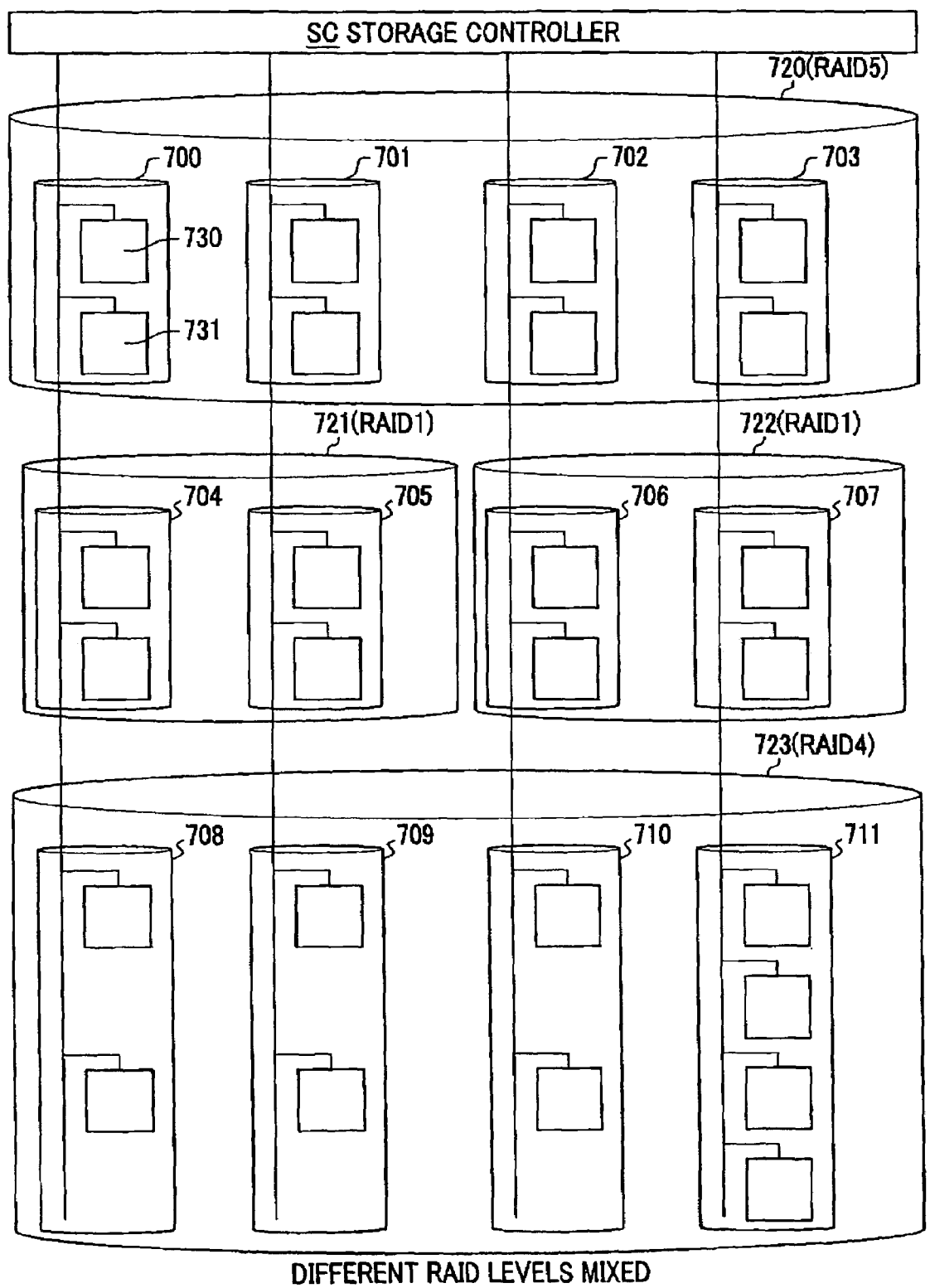
FIG. 7 is a block diagram showing a structure of RAID groups of the storage system according to the embodiment of the present invention.

FIG. 7 is a block diagram showing a structure of RAID groups of the storage system 100 according to the present embodiment. A RAID group 720 is a RAID group on RAID level 5, which is constituted by wear-leveling groups 700 to 703. For example, the wear-leveling 700 is constituted by flash memory modules 730, 731. Note that a RAID is classified in to a level, such as RAID level 0 or RAID level 1, and so on, depending on a function thereof.

A RAID group 721 is a RAID group on RAID level 1 constituted by wear-leveling groups 704, 705. Similarly, a RAID group 722 is a RAID group on RAID level 1 constituted by wear-leveling groups 706, 707

In the storage system 100, if a RAID is classified into levels 0, 1, 3, 5, 6 or 1+0, equal capacity is provided for logical page address area of each of the wear-leveling groups constituting a same RAID group. An upper limit of wear-leveling group capacity is defined by Formula 1, and a lower limit thereof is defined by Formula 2. Specifically, a product of "sustained write speed of a flash memory module" and "system endurance" divided by "flash memory endurance" yields a second value (upper limit). A product of "effective write speed of a flash memory module while the system is being operated" and "system endurance" divided by "flash memory endurance" yields a first value (lower limit). Then, capacity of logical page address area of each wear-leveling group is set to be not less than the first value and not more than the second value. For example, system endurance is usually from 5 to 10 years, and flash memory endurance is usually from 10,000 to 100,000 counts. Effective write speed in the Formula 2 denotes effective write speed in consideration of write access ratio from a host system to the storage system 100.

$$\text{Wear-leveling Group Capacity Value (Upper Limit)} = \frac{\text{Sustained Write Speed per Module} \times \text{System Endurance}}{\text{Flash Memory Endurance}} \quad [\text{Formula 1}]$$

$$\text{Wear-leveling Group Capacity Value (Lower Limit)} = \frac{\text{Effective Write Speed per Module} \times \text{System Endurance}}{\text{Flash Memory Endurance}} \quad [\text{Formula 2}]$$

Capacity of the wear-leveling group is set to fall in a range defined by Formula 1 and Formula 2. By providing wear-leveling for flash memory modules in a wear-leveling group, flash memory module endurance can be ensured within a system endurance period of the storage system 100.

A RAID group 723 is a RAID group on RAID level 4 constituted by wear-leveling groups 708 to 711; and the wear-leveling groups 708 to 710 are wear-leveling groups for storing data; and the wear-leveling group 711 is a wear-leveling group for storing parities. The wear-leveling group for storing parities has more updating counts than those of other wear-leveling groups for storing data. Therefore, in order to provide a wear-leveling process in a RAID group on RAID level 4, capacity of the logical page address area in the wear-leveling group for storing parities is set to be larger than that of the logical page address area in the wear-leveling group for storing data. For example, if the number of wear-leveling groups constituting a RAID group is "n", capacity of the logical page address area of the wear-leveling group for storing parities is set to be not less than one time and not more than (n−1) times as much as that of wear-leveling groups for storing data.

Not shown in the drawing, on RAID level 2, wear-leveling groups for storing redundant information have more update counts than those of wear-leveling groups for storing data. For example, on RAID level 2, if there are 10 wear-leveling groups for storing data and 4 wear-leveling groups for storing parities (10D4P), capacity of logical page address area in wear-leveling groups for storing redundant information is set to be not less than one time and not more than 10/4=2.5 times as much as that of a logical page address area in wear-leveling groups for storing data. As for 25D5P, capacity of logical page address area in wear-leveling groups for storing redundant information is set to be not less than one time and not more than 25/5=5 times as much as that of logical page address area in wear-leveling groups for storing data.

In other words, on RAID level 2 or RAID level 4, if the number of wear-leveling groups for storing data is "n", and the number of wear-leveling groups for storing redundant information is "m", capacity of logical page address area in wear-leveling groups for storing redundant information is set to be not less than one time and not more than "n/m" times as much as that of logical page address area in wear-leveling groups for storing data.

In this way, each RAID group in the storage controller SC is constituted by combining wear-leveling groups. Specifically, the storage controller SC manages each RAID group in consideration of wear-leveling groups thereof. Therefore, a virtual page address of each wear-leveling group is deemed as independent, regardless of a mapping between a logical page address and a virtual page address in each wear-leveling group. Accordingly, the storage controller SC can connect plural RAID groups on different levels with one another.

Figure 8:
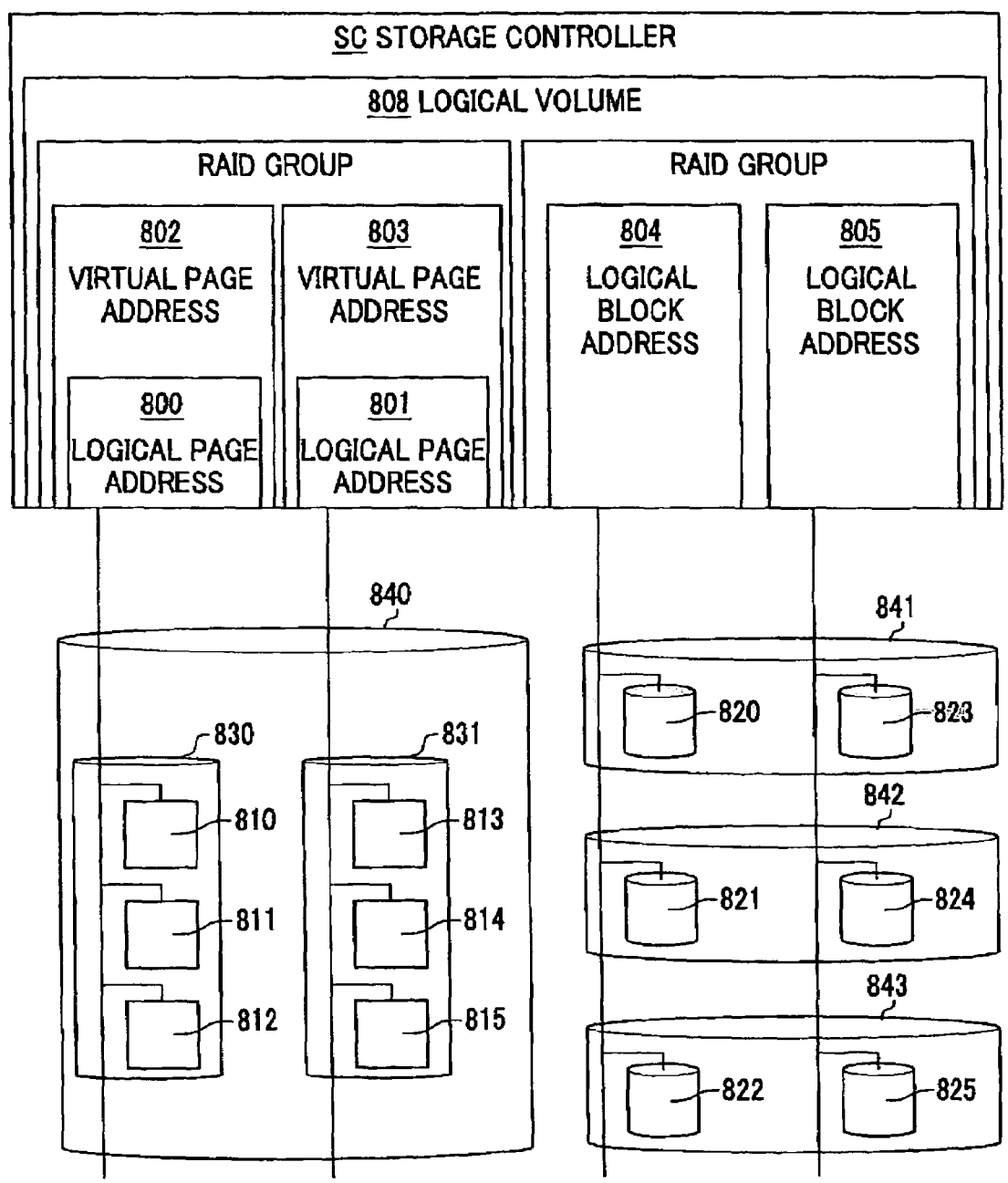
FIG. 8 is a block diagram showing an example in which flash memory modules and hard disk drives are connected with a storage controller.

FIG. 8 is a block diagram showing an example in which flash memory modules and hard disk drives are connected with the storage controller SC. Flash memory modules 810 to 812 constitute a wear-leveling group 830. Flash memory modules 813 to 815 constitute a wear-leveling group 831, and the wear-leveling groups 830, 831 constitute a RAID group 840.

Similarly in FIG. 6, the storage controller SC translates logical page address 800 into a virtual page address 802 so as to access to either one of the flash memory modules 810 to 812. The storage controller SC also translates a logical page address 801 into a virtual page address 803 so as to access to either one of the flash memory modules 813 to 815.

Hard disk drives 820 and 823 are combined into a RAID group 841. Similarly, hard disk drives 821 and 824 are combined into a RAID group 842; and hard disk drives 822 and 825 are combined into a RAID group 843. The storage controller SC accesses to each hard disk drive via the logical block address 804 or 805. In a RAID group constituted by hard disk drives, no wear-leveling groups are defined because no wear-leveling is needed. The storage controller SC defines wear-leveling groups only in a RAID group constituted by flash memory modules, and translates a logical page address into a virtual page address.

When the system is activated or storage media is connected with the system, the storage controller SC changes control on determination of whether or not any address translation is necessary, or determination of how to configure a RAID group, etc., depending on whether the storage media is flash memories or hard disk drives.

The storage controller SC constitutes a logical volume 808 by using either area of the RAID group 840 constituted by flash memory modules or the RAID groups 841 to 843 constituted by hard disk drives, or by combining areas of the RAID group 840 and the RAID groups 841 to 843. How to choose storage area of flash memory modules or storage area of hard disk drives may be such that data having more read accesses and less update counts is stored on flash memory modules, and data having more update counts is stored on hard disk drives. Flash memory modules can access to hard disk drives with law latency. Therefore, if storage area is chosen depending on access property of storage media, as described above, high performance for the storage system can be realized.

An explanation will be given on operations of the storage system 100 according to the present embodiment, with reference to drawings.

With reference to FIG. 9 to FIG. 14, an explanation will be given on a wear-leveling method for the storage system 100 according to the present embodiment. This method provides wear-leveling among plural flash memory modules.

Figure 9:
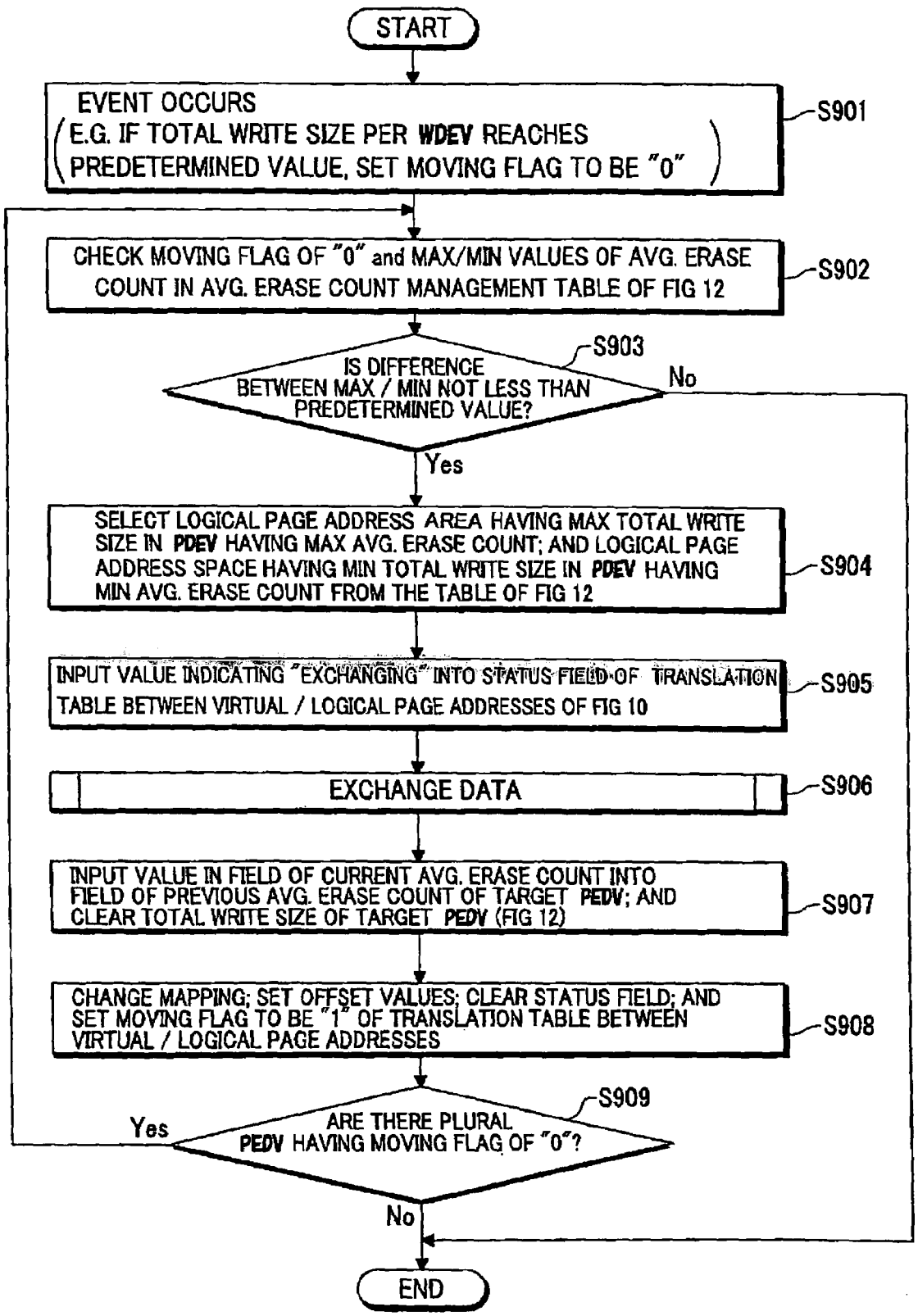
FIG. 9 is a flow chart showing a method for wear-leveling among plural flash memory modules.

FIG. 9 is a flow chart showing a wear-leveling process among plural flash memory modules. To be simplified, it is assumed that a target wear-leveling group W00 has two flash memory modules P00, P04.

FIG. 10 shows an address translation table between a virtual page address and a logical page address before a data exchange process accompanied by the wear-leveling process according to the present embodiment.

FIG. 11 shows the address translation table between the virtual page address and the logical page address after the data exchange accompanied by the wear-leveling process according to the present embodiment.

With reference to FIG. 10 and FIG. 11, mappings between the virtual page address and the logical page address are indicated, as well as offset values for the mappings. In the storage system according to the present embodiment, a logical page address area (data length) is set to be larger than a corresponding virtual page address area (data length). In the logical page address area, an offset value "0" is indicated if a valid data is written on a start address side and free area exists on an end address side. An offset value "1" is indicated if a valid data is written on an end address side and free area exists on a start address side. In this case, free area has a size that is an integral multiple (at least one time) of a data section of a flash memory page, and that is equal to data size that a memory controller in a flash memory module can read/write onto a flash memory at a time.

FIG. 12 shows an erase count management table for each flash memory module, which is managed by the storage controller SC. The storage controller SC records a total write size of each area serving as a unit for data exchange within a flash memory module. As shown in Formula 3, an average erase count of flash memories in the flash memory module can be obtained by adding a previous average erase count value to an average process count yielded by dividing a sum of an individual total write size of each logical page address area of a module in a separate predetermined time period by an entire logical page address area capacity of the module (module capacity).

$$\text{Average Erase Count} = \text{Previous Value} + \frac{\sum \begin{array}{c}\text{Sum of Individual Total Write Size of}\\ \text{Each Logical Page Address Area of a}\\ \text{Module in a Separate Predetermined}\\ \text{Time Period}\end{array}}{\text{Module Capacity}} \quad \text{[Formula 3]}$$

In the management table of FIG. 12, there are recorded two average erase count values. One is a previous average erase count (f00, f04) recorded at the last time of executing a wear-leveling process, and the other is a current average erase count up to the present (e00, e04). The total write size used for managing write counts of each logical page address area is recorded from the last time when the previous wear-leveling process was performed up to the present. A current average erase count is easily calculated by Formula 3. Recent access frequencies on logical page address area can be obtained by managing the total write size of the logical page address area in each separate predetermined time period. In the management table, a moving flag is set in such a manner that the flag is set to be "0" before the data exchange process, and the flag is set to be "1" after the data exchange process. In Formula 3, the total write size is managed in each separate time period. Providing no separate predetermined time period, the total write size through the entire time period can be represented by Formula 4. Either result from Formula 3 or Formula 4 yields the same average erase count value.

$$\text{Average Erase Count} = \frac{\sum \begin{array}{c}\text{Sum of Individual Total Write Size of}\\ \text{Each Logical Page Address Area of a}\\ \text{Module through Entire Predetermined}\\ \text{Time Period}\end{array}}{\text{Module Capacity}} \quad \text{[Formula 4]}$$

The address translation tables shown in FIG. 10 or FIG. 11 and an average erase count management table in FIG. 12 are required to be maintained even when a failure occurs such as a power failure or when it is out of the system service time. Therefore, the storage controller SC stores, on each predetermined area of each flash memory module, data related to the address translation table, and the average erase count management table for each module.

In FIG. 9, the storage controller SC performs the wear-leveling process when an event occurs, for example, every time total write size of any wear-leveling group (WDEV) reaches a predetermined value, or in every predetermined time period. At this time, the storage controller SC sets a moving flag of the flash memory module in the wear-leveling group to be "0" (S901).

Next, the storage controller SC checks that the moving flag is set to "0", and a maximum value and a minimum value of the average erase count, by looking up the average erase count management table of FIG. 12 (S902).

The storage controller SC determines whether or not a difference between the maximum value and the minimum value of the average erase count is not less than a predetermined value (S903). If the difference of the erase count is not less than the predetermined value, the storage controller SC proceeds to S904. If the difference of the erase count is less than the predetermined value, the storage controller SC completes the process.

Then, the storage controller SC, from the management table of FIG. 12, selects a logical page address area having a maximum total write size in a flash memory module (PDEV) having a maximum average erase count; and a logical page address having a minimum total write size in the flash memory module (PDEV) having a minimum average erase count (S904).

Next, the storage controller SC sets a status field of the address translation table of FIG. 10 between a virtual page and a logical page as "exchanging". Specifically, the storage controller SC inputs a value indicating "exchanging" into the status field of the translation table of FIG. 10, in order to perform data exchange between two selected logical page address areas and change mapping with corresponding virtual page addresses (S905). The storage controller SC temporarily stays on standby in accessing to storage area on which "exchanging" is indicated, and tries an access again to the storage area after the data exchange operation and the mapping change operation are completed. During this process, data written from a host system is stored on cache memories in the storage controller SC.

Next, the storage controller SC exchanges data between the above two logical page address areas (S906). A detailed description on the data exchange process will be given later.

After the data exchange process, the storage controller SC updates a current average erase count value in a field of a flash memory module (PDEV) to which the data exchange target area belongs, where the previous average erase count value has been recorded, and clears the total write size (S907). Accordingly, the average erase count value immediately after the data exchange operation is identical to the previous average erase count value.

The storage controller SC, as shown in FIG. 11, changes the mapping and the offset value between the virtual page address and the logical page address, and clears the status field, and then sets the moving flag to be "1" (S908). In FIG. 12, the wear-leveling group W00 to be a target for wear-leveling includes two flash memory modules P00, P04. Therefore, if there is performed any data exchange between the flash memory modules P00, P04, the moving flags of the flash memory modules P00, P04 are both set to be "1".

The storage controller SC determines whether or not there are plural flash memory modules (PDEV) having moving flags of "0" (S909). If it is determined that there area no plural flash memory modules having moving flags of "0", the storage controller SC completes the wear-leveling process. If it is determined there are any plural flash memory modules having moving flags of "0", the storage controller SC returns to S902. In FIG. 12, if both moving flags of the flash memory modules P00, P04 are set to be "1", the storage controller SC completes the wear-leveling process. For example, if the wear-leveling group includes four or more flash memory modules, the storage controller SC further checks whether or not the data exchange can be performed between the rests of flash memory modules at S902.

Every time the wear-leveling process is performed, the mapping between the virtual page address and the logical page address is changed, and the average erase count is updated as well. Hence, the address management table (FIG. 10 or FIG. 11) and the average erase count management table of FIG. 12 stored on a predetermined area of the flash memory module are required to be updated every time the wear-leveling process is processed.

Now, the data exchange process at S906 will be described as follows.

Figure 13:
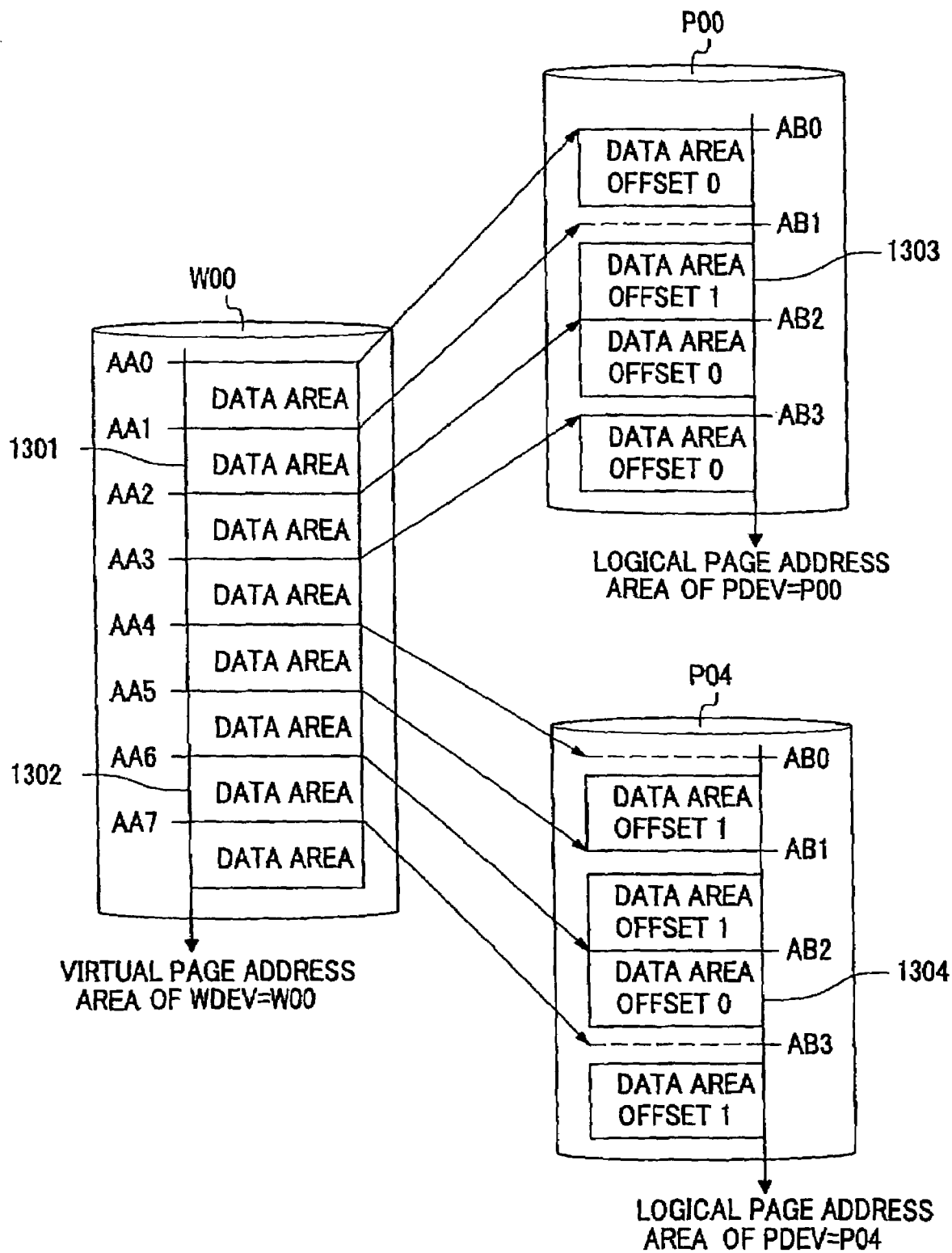
FIG. 13 is a block diagram for explaining a mapping between a virtual page address and a logical page address before the data exchange process accompanied by the wear-leveling process.

FIG. 13 is a block diagram for explaining the mapping between the virtual page address and the logical page address before the data exchange process accompanied by the wear-leveling process. To provide an example, it will be explained herein on how to exchange data and how to change mapping between a data area 1301 of a virtual page address area and a data area 1302 of a virtual page address area. The data area 1301 of the virtual page address area is corresponding to a data area 1303 of a logical page address area. The data area 1302 of the virtual page address area is corresponding to a data area 1304 of a logical page address area. For example, it is assumed that on the logical page address area, there is any free area among the data areas. If the free area is located after a related data area, the offset value is set to be "0"; and the free area is located before the related data area, the offset value is set to be "1". For example, in FIG. 13, since the data area 1303 has a free area (shown in a broken line) therebefore, the offset thereof is set to be "1"; and the data area 1304 has a free area thereafter (shown in a broken line), the offset thereof is set to be "0". Therefore, it is set that the entire memory capacity of a logical page address area becomes larger than that of a virtual page address area.

Figure 14:
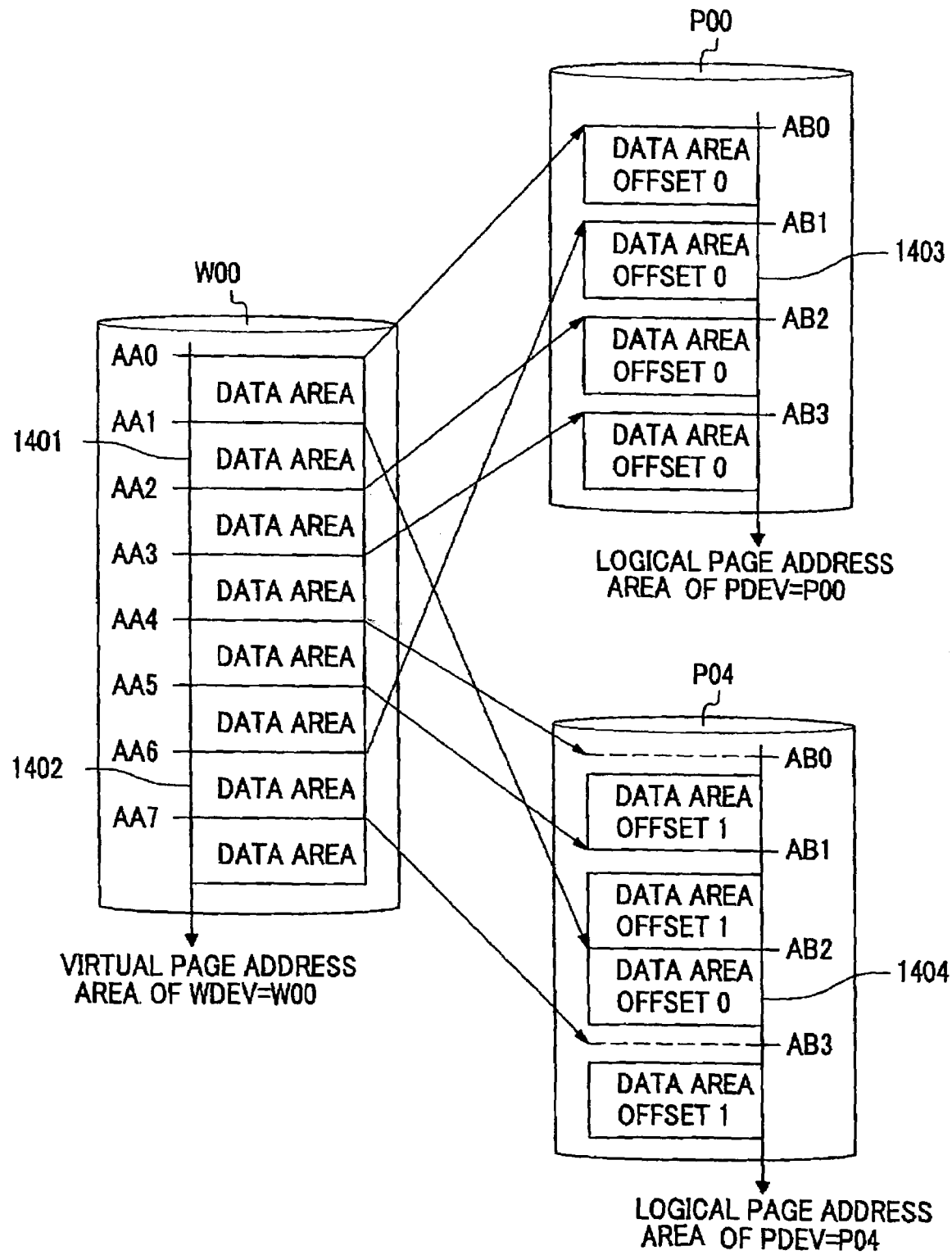
FIG. 14 is a block diagram for explaining a mapping between the virtual page address and the logical page address after the data exchange process accompanied by the wear-leveling process.

FIG. 14 is a block diagram for explaining mapping between a virtual page address and a logical page address after performing the data exchange accompanied by the wear-leveling process. Data area 1401 of the virtual page address area is corresponding to data area 1404 of a logical page address area; and data area 1402 of the virtual page address area is corresponding to the data area 1403 of the logical page address area. The offset value of the data area 1403 is "0", and the offset value of the data area 1404 is "0".

To provide an example of the data exchange process, FIG. 15 to FIG. 24 show how to exchange data between data area having an offset value of "0" and data area having an offset value of "1", on a step by step basis. In FIG. 15 to FIG. 24, on the left side is a logical page address area having an offset value of "0". As shown in the drawing, the logical page address area is divided into five, as indicated in "E", "F", "G", "H" and "-", respectively. "E" to "H" indicate areas on which valid data is written, and "-" indicates a free area.

In FIG. 15 to FIG. 24, on the right side is a logical page address area having an offset value of "1". The logical page address area is divided into five, as indicated in "A", "B", "C", "D" and "-", respectively. "A" to "D" indicate areas on which valid data is written, and "-" indicates a free area.

Figure 15:
FIG. 15 shows an initial status before the data exchange process.

FIG. 15 shows an initial status before the data exchange process. The offset value is "0" on the left side, and the offset value is "1" on the right side.

Figure 16:
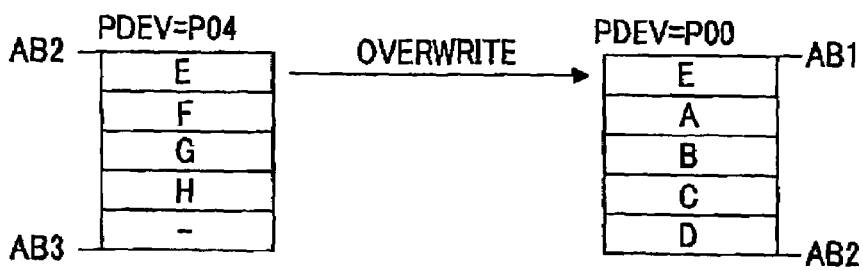
FIG. 16 shows a status during the data exchange process.

FIG. 16 shows a status during the data exchange process, and data on the logical page address area E on the left side (the offset value of "0") is overwritten onto the free area on the right side (the offset value of "1").

Figure 17:
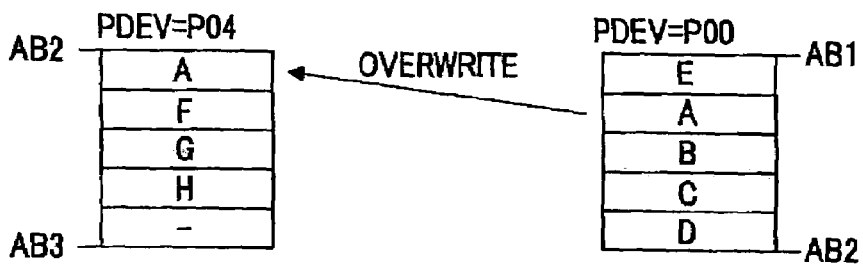
FIG. 17 shows a status during another data exchange process.

FIG. 17 shows a status during the data exchange process, and data on the logical page address area A on the right side is overwritten onto the original logical page address area E on the left side.

Figure 18:
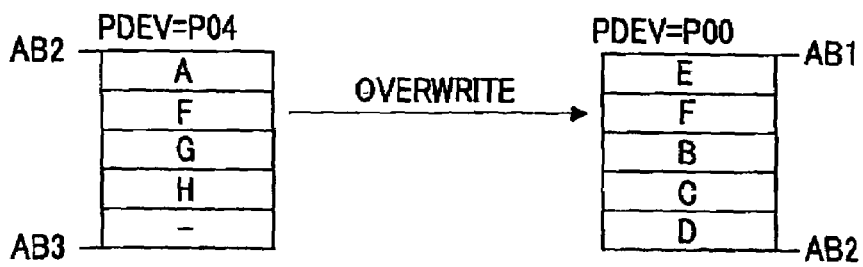
FIG. 18 shows a status during another data exchange process.

FIG. 18 shows a status during the data exchange process, and data on the logical page address area F on the left side is overwritten onto the original logical page address area A on the right side.

Figure 19:
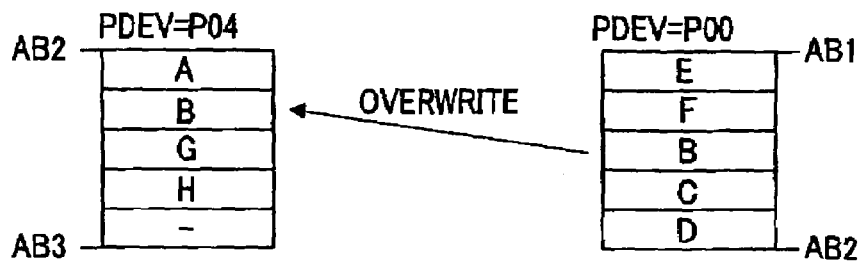
FIG. 19 shows a status during another data exchange process.

FIG. 19 shows a status during the data exchange process, and data on the logical page address area B on the right side is overwritten onto the original logical page address area F on the left side.

Figure 20:
FIG. 20 shows a status during another data exchange process.

FIG. 20 shows a status during the data exchange process, and data on the logical page address area G on the left side is overwritten onto the original logical page address area B on the right side.

Figure 21:
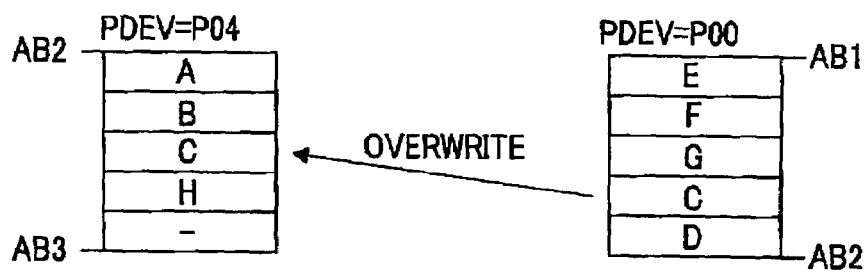
FIG. 21 shows a status during another data exchange process.

FIG. 21 shows a status during the data exchange process, and data on the logical page address area C on the right side is overwritten onto the original logical page address area G on the left side.

Figure 22:
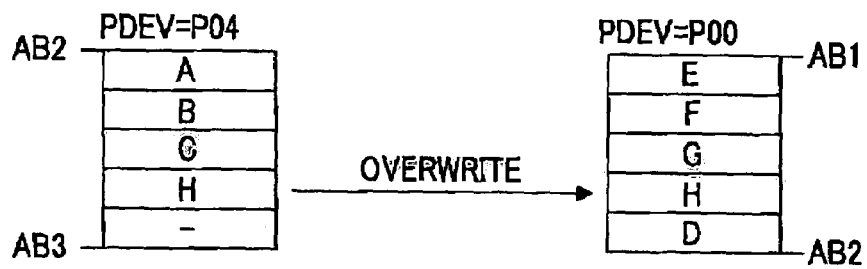
FIG. 22 shows a status during another data exchange process.

FIG. 22 shows a status during the data exchange process, and data on the logical page address area H on the left side is overwritten onto the original logical page address area C on the right side.

Figure 23:
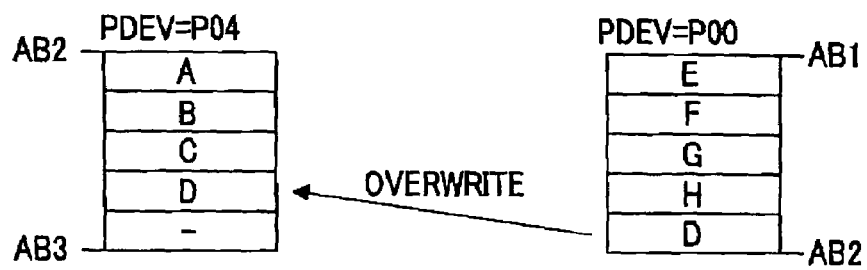
FIG. 23 shows a status during another data exchange process.

FIG. 23 shows a status during the data exchange process, and data on the logical page address area D on the right side is overwritten onto the original logical page address area H on the left side.

Figure 24:
FIG. 24 shows a final status after the data exchange process.

FIG. 24 shows a final status after the data exchange process. The offset value is "0" on the left side, and the offset value is "0" on the right side.

Basically, a flash memory is a semiconductor device in which an overwrite process cannot be performed on a physical address area. To be specific, in order to exchange data on physical address area, actually data is copied onto an unused page, and then an original page on which the data is stored is set as an invalid page. Therefore, no actual overwrite process is performed onto this original page.

According to the present embodiment, the above processes are all carried out on logical page address area basis, therefore it is possible to overwrite data onto a logical page. In this way, the wear-leveling process can be performed based on data exchange by performing such overwrite process.

Figures 25, 26:
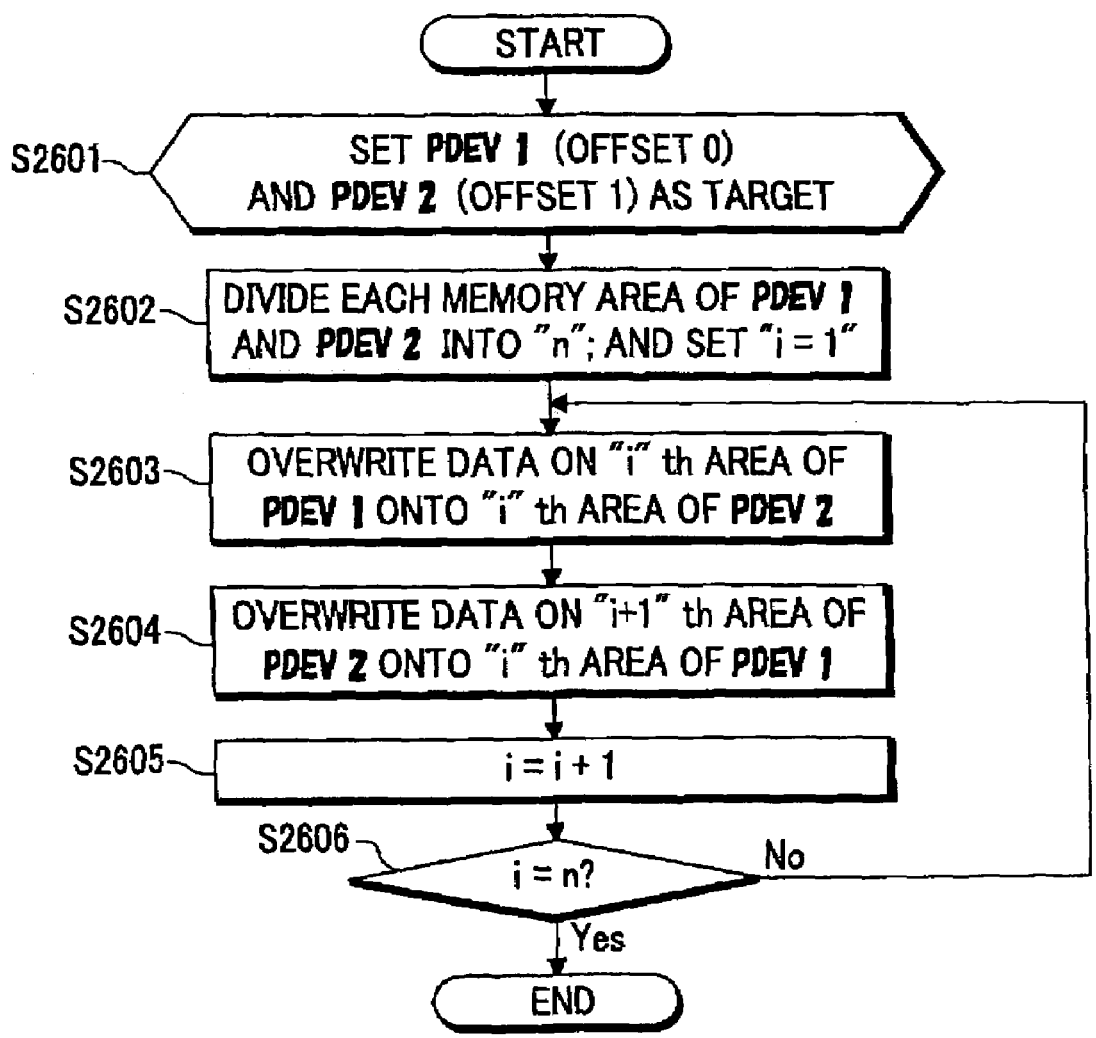
FIG. 25 is a table showing how offset values transit before/after the data exchange process.
FIG. 26 is a flow chart showing a data exchange process between a logical page address area having an offset value of "0" and a logical page address area having an offset value of "1", as explained in FIG. 15 to FIG. 24.

FIG. 25 is a table showing how offset values transit before/after the data exchange process.

If data exchange is carried out between logical page address areas both having offset values of "0", the offset values after the data exchange process become "0" and "1", respectively. If data exchange is carried out between a logical page address area having an offset value of "0" and a logical page address area having an offset value of "1", the offset values after the data exchange process become "0" and "0", respectively. If data exchange is carried out between logical page address areas both having offset values of "1", the offset values after the data exchange process become "1" and "0", respectively.

A detailed description will be given on the data exchange process, with reference to a flow chart.

FIG. 26 is a flow chart showing the data exchange process between a logical page address area having an offset value of "0" and a logical page address area having an offset value of "1", as explained in FIG. 15 to FIG. 24. The storage controller SC herein sets a data exchange target between a logical page address area having an offset value of "0" and a logical page address area having an offset value of "1" (S2601).

The storage controller SC divides the target logical page address area into "n"; and sets as "i=1" (S2602). As for FIG. 15, for example, it is set as "n=5", and valid data is written onto divided (n−1) sections, and the rest one section is used for free area. The storage controller SC moves data from the "i"th logical page address area having an offset value of "0" to the "i"th logical page address area having an offset value of "1" (S2603), and then also from the "i+1"th logical page address area having the offset value of "1" to the "i"th logical page address area having an offset value of "0" (S2604); and increases "i" by "1" (S2605). Then, the storage controller SC determines whether it is "i=n" or not (S2606). If it is not determined as "i=n", then the storage controller SC returns to S2603. If it is determined as "i=n", the storage controller SC completes the data exchange process.

Figure 27:
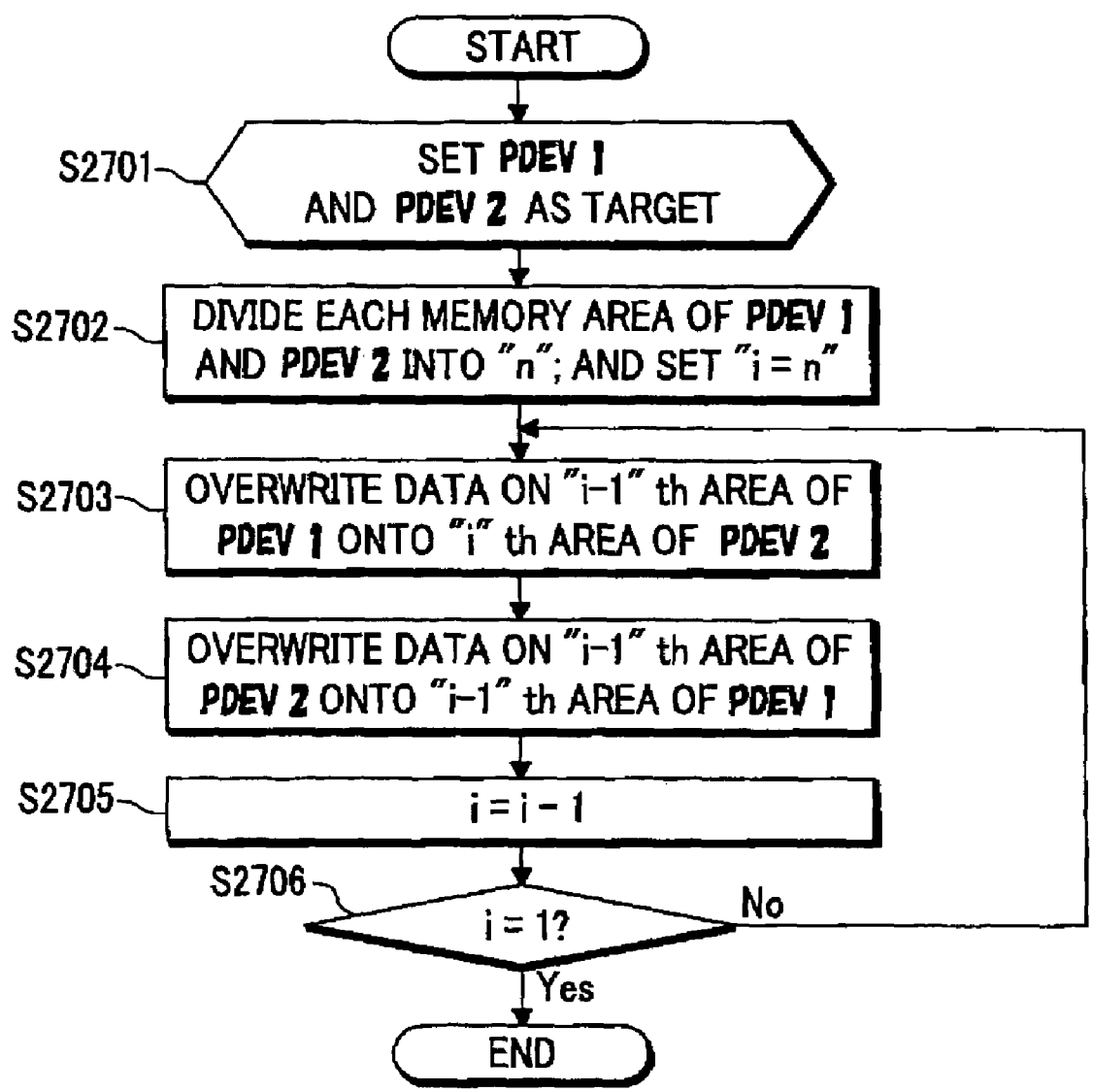
FIG. 27 is a flow chart showing a data exchange process between a logical page address area having an offset value of "0" and a logical page address area having an offset value of "0".

FIG. 27 is a flow chart showing a data exchange process between a logical page address area having an offset value of "0" and a logical page address area having an offset value of "0". The storage controller SC herein sets a data exchange target between a logical page address area having an offset value of "0" and a logical page address area having an offset value of "0" (s2701).

The storage controller SC divides the target logical page address area into "n" and set as "i=n" (S2702). Valid data is written onto divided (n−1) sections, and the rest one is for free area. Until it reaches "i=1", the data exchange process is repeated on a section by section basis (S2703 to S2706). At S2706, if it is determined as "i=1", the data exchanging process is completed.

Figure 28:
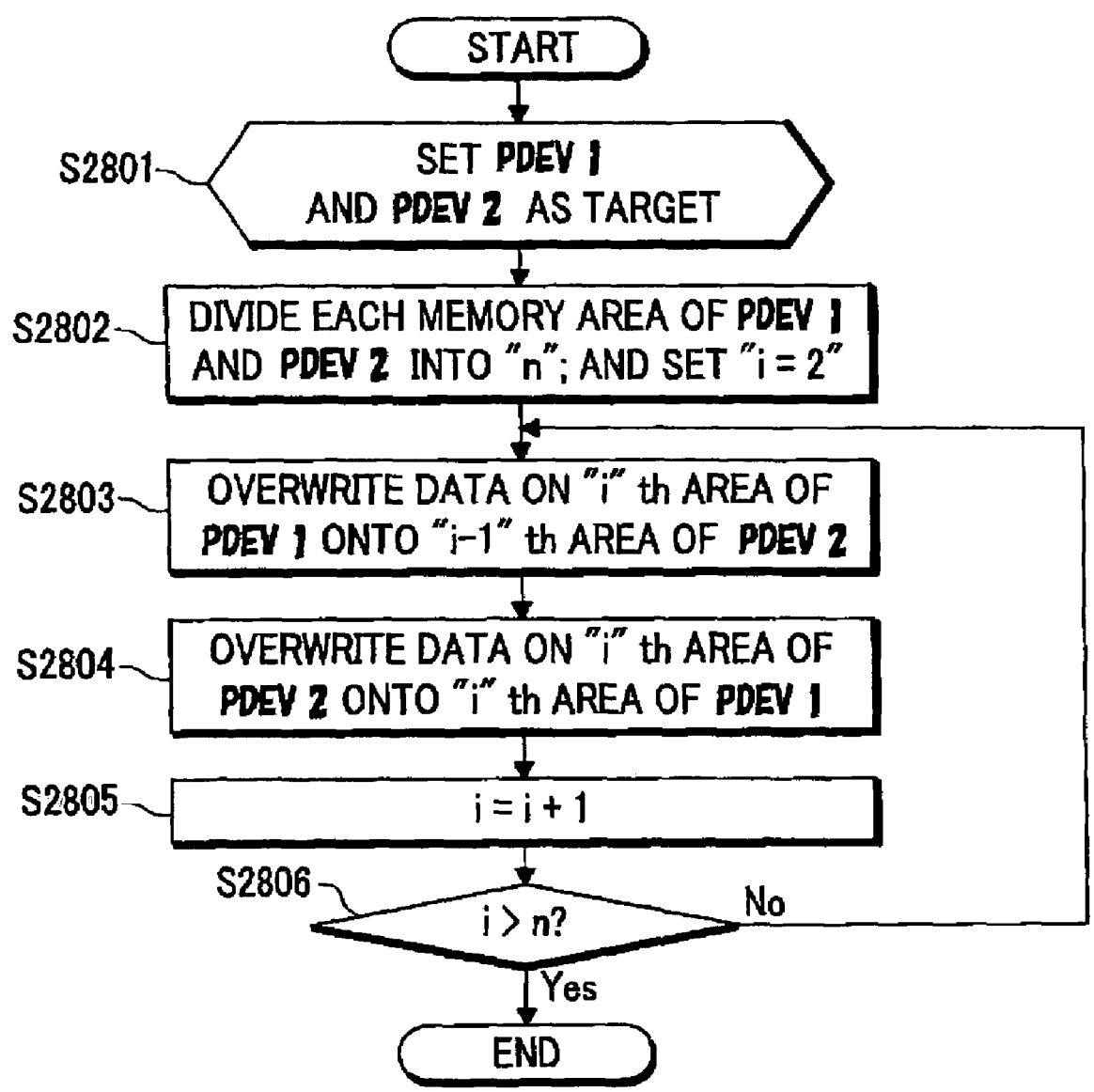
FIG. 28 is a flow chart showing a data exchange process between a logical page address area having an offset value of "1" and a logical page address area having an offset value of "1".

FIG. 28 is a flow chart showing a data exchange process between a logical page address area having an offset value of "1" and a logical page address area having an offset value of "1". The storage controller SC herein sets a data exchange target between the logical page address area having the offset value of "1" and the logical page address area having the offset value of "1" (S2801).

The storage controller SC divides the targeted logical page address area into "n"; and sets as "i=2" (S2802). Valid data is written onto divided (n−1) sections, and the rest one section is used for free area. Until it becomes "i>n", the data exchange process is repeated on a section by section basis (S2803 to S2806). At S2806, if it is determined as "i>n", the data exchange process is completed.

FIG. 29 to FIG. 34 are drawings for explaining a wear-leveling process according to another embodiment of the present invention. According to the above mentioned embodiment, free areas for data exchange are distributed in a flash memory module. In this embodiment, a method will be explained in which free areas are handled into a group on each module.

Figure 29:
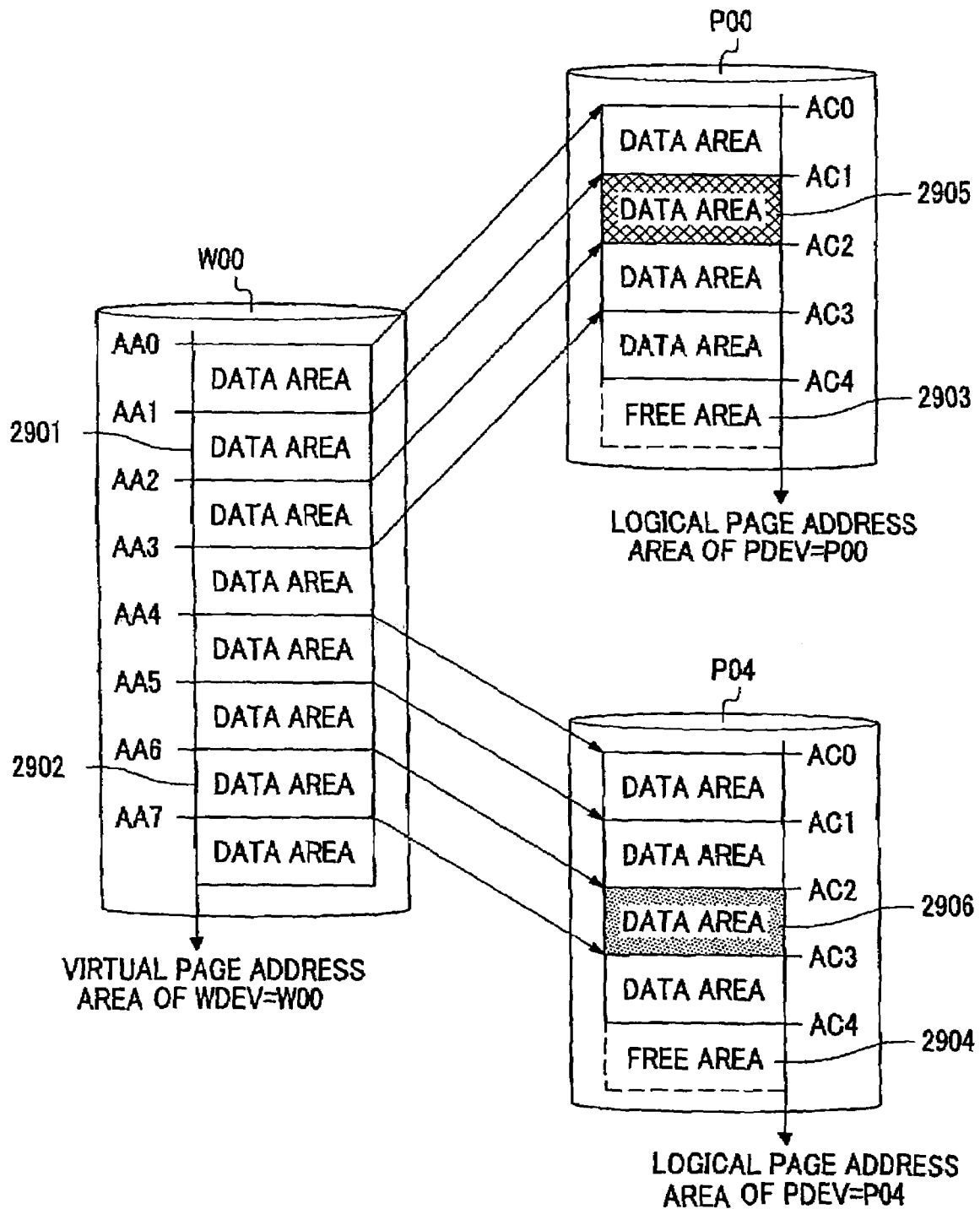
FIG. 29 is a block diagram for explaining a mapping between a virtual page address and a logical page address before the data exchange process.

FIG. 29 is a block diagram for explaining mapping between a virtual page address and a logical page address before performing the data exchanging process.

Figure 30:
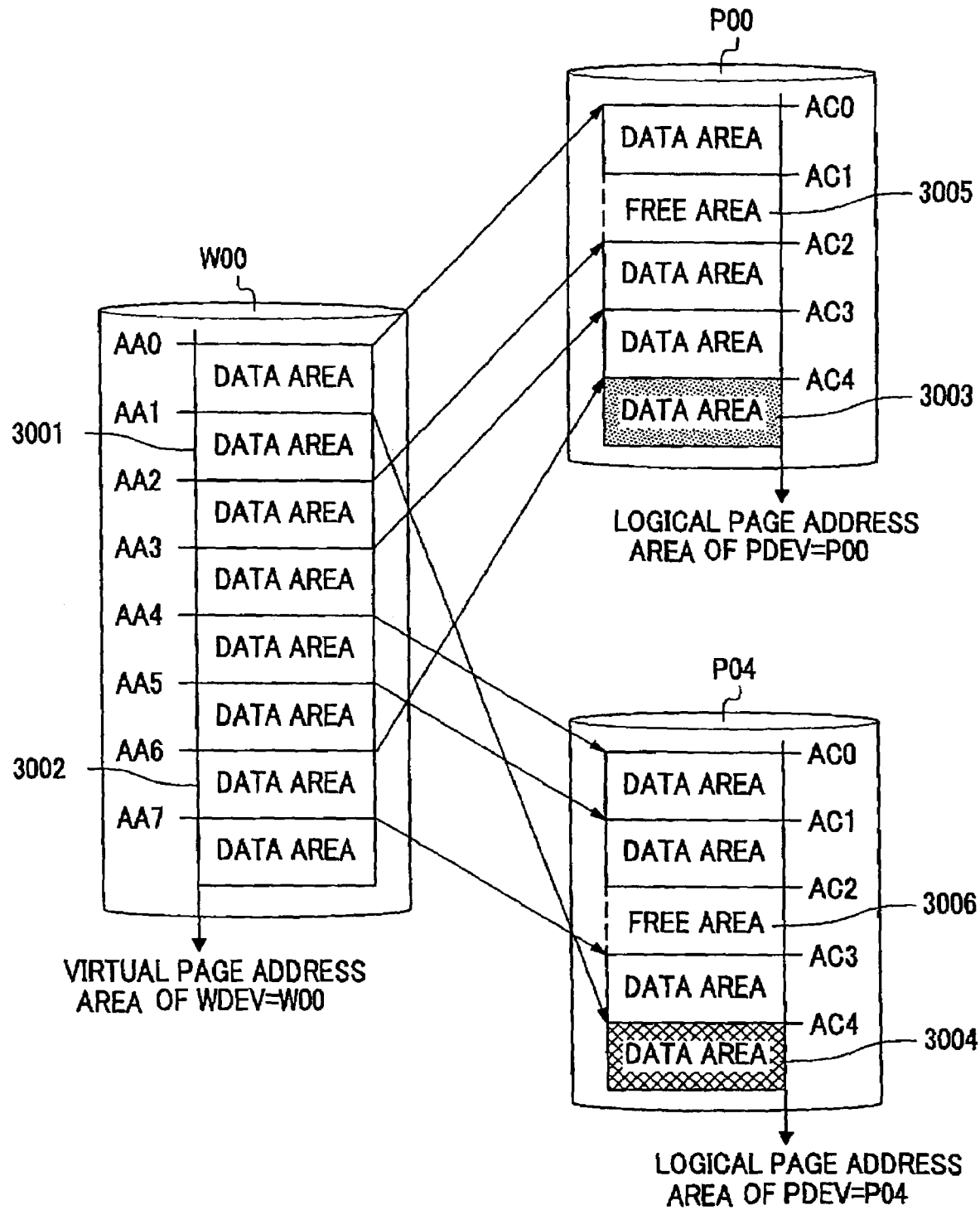
FIG. 30 is a block diagram for explaining mapping between a virtual page address and a logical page address after the data exchanging process.

FIG. 30 is a block diagram for explaining mapping between the virtual page address and the logical page address after performing the data exchanging process. To be simplified, it is assumed that a target wear-leveling group W00 has two flash memory modules P00, P04. In a status before the data exchange (FIG. 29), the logical page address areas of the flash memory modules P00, P04 are provided with data area from address AC0 before address AC4. Area of address AC4 or more serves as free area for the data exchange (2903, 2904). This free area has the same size (data length) as that of data area for the data exchange to perform the wear-leveling process.

FIG. 31 is a table for explaining an address translation table for the data exchange between a virtual page address and a logical page address before performing the data exchange process. FIG. 32 is a table for explaining the address translation table for the data exchange between the virtual page address and the logical page address after performing the data exchange process. In this embodiment, since the free areas for the data exchange are handled into a group, such a management on offset values that is required on the address translation table of FIG. 10 and FIG. 11 is unnecessary. Instead, it is required to manage free area locations.

Figures 33, 34, 35:
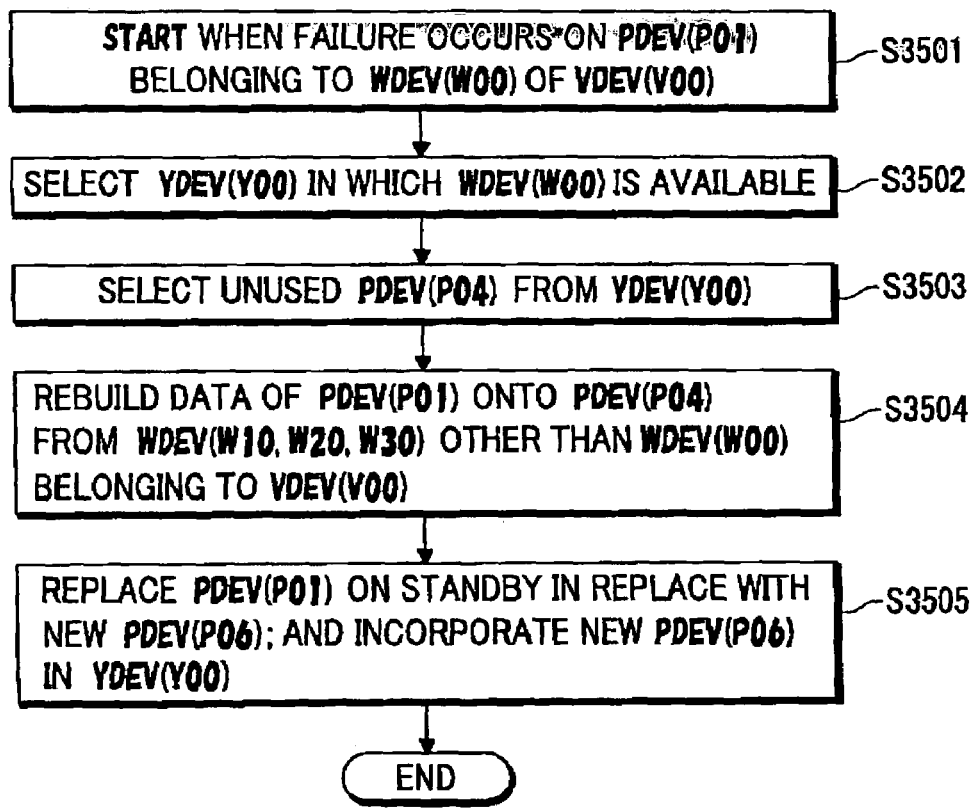
FIG. 33 is a table for explaining a free area management table before the data exchange process.
FIG. 34 is a table for explaining the free area management table after the data exchange process.
FIG. 35 is a flow chart showing steps of how to replace flash memory modules.

FIG. 33 is a table for explaining a free area management table before performing the data exchanging process, and FIG. 34 is a table for explaining the free area management table after performing the data exchange process. The free area management table manages a start logical page address and size (data length) of the free area in each flash memory module.

With reference to FIG. 29, an explanation will be given on how to exchange data between a data area 2901 and a data area 2902 of a virtual page address area, and how to change mapping between a virtual address page and a logical page address. As shown in the address translation table between the logical page address and the virtual page address, in FIG. 31, it is understood that the data area 2901 in the virtual page address area is corresponding to data area 2905 in the logical page address area; and the data area 2902 in the virtual page address area is corresponding to data area 2906 in the logical page address area. With reference to the free area management table in FIG. 33, it is understood that free area for the data exchange in the flash memory module P00 is area 2903; and free area for the data exchange in the flash memory module P04 is area 2904.

Next, data on the data area 2905 is written onto the free area 2904, the data on the data area 2906 is written onto the free area 2903. As shown in FIG. 30, data area 3001 in the virtual page address area is set to be corresponding to data area 3004 in the logical page address area; and data area 3002 in the virtual page address area is set to be corresponding to data area 3003 in the logical page address area. After the above data exchange process is completed, the translation table between the virtual page address and the logical page address is updated, as shown in FIG. 32. As shown in FIG. 34, it is understood that free area for the data exchange in the flash memory module P00 is area 3005; and free area for the data exchange in the flash memory module P04 is area 3006.

According to the present embodiment, free areas for the data exchange are handled into a group per every module, instead of distributing the free area for the data exchange in a flash memory module as explained in the other embodiment, whereby a management on offset values is eliminated, resulting in an easier control on the data exchange.

Next, an explanation will be given herein on a case when a failure occurs on a flash memory module (PDEV).

With reference to FIG. 35 to FIG. 39, a description will be given on a method how to replace a flash memory module when a failure occurs on the flash memory module.

FIG. 35 is a flow chart showing steps of replacing a module.

FIG. 36 to FIG. 39 are block diagrams for explaining each step of the flow chart of FIG. 35.

Figure 36:
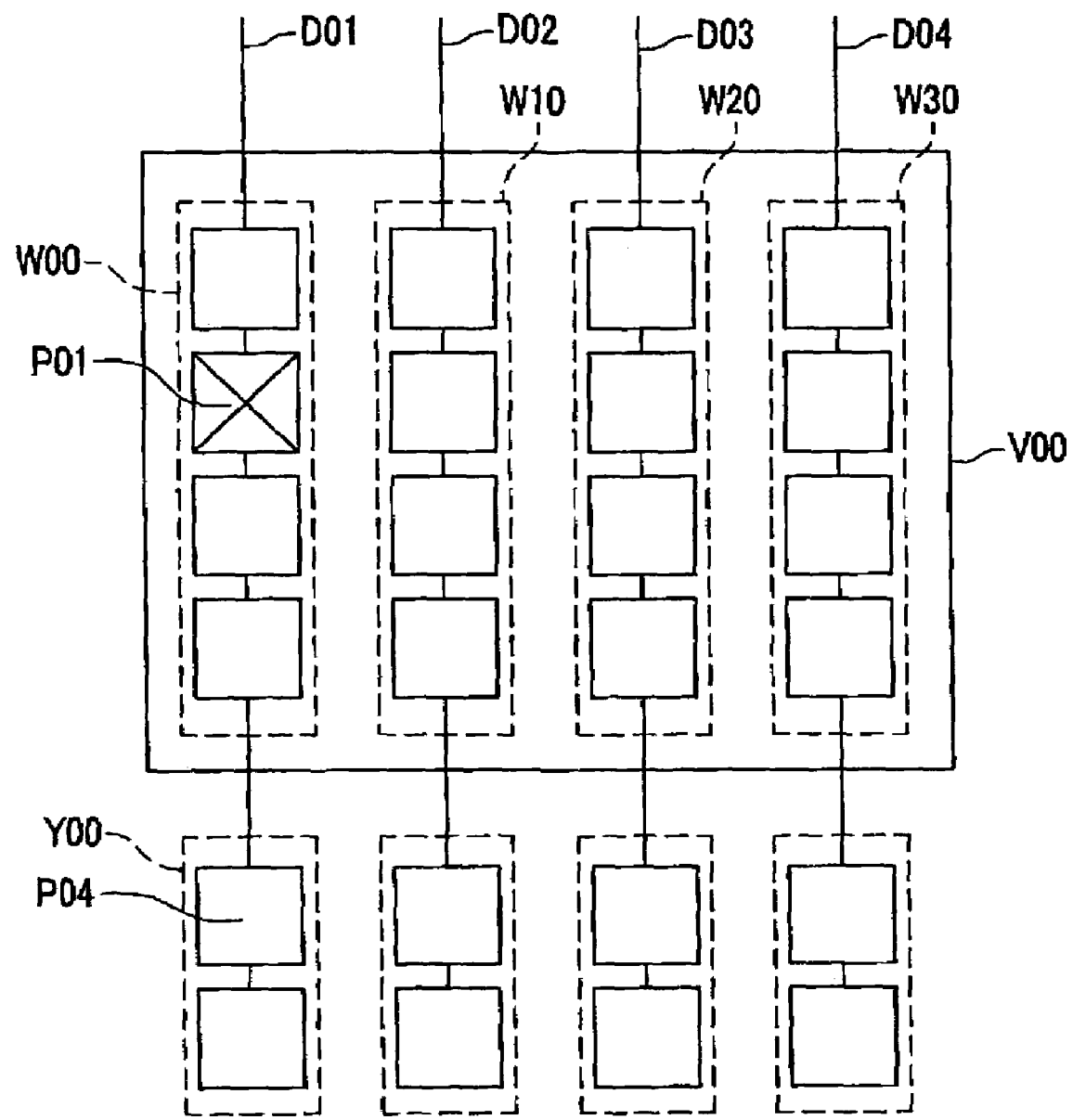
FIG. 36 shows a case when a failure occurs on a flash memory module.

FIG. 36 shows a case when a failure occurs on a flash memory module. FIG. 36 shows a RAID group (VDEV) V00, and wear-leveling groups (WDEV) W00, W10, W20, W30, which constitutes the RAID group V00. A spare group (YDEV) Y00 is connected on a same channel D01, on which the wear-leveling group W00 is connected. Now, it is assumed that a failure occurs on a flash memory module (PDEV) P01 in the wear-leveling group W00 (S3501).

Then, a spare group (YDEV) in which the wear-leveling (WDEV) W00 is available is selected. A spare group Y00 which is connected on the same channel D01 of the wear-leveling group W00 is selected (S3502). Then, from flash memory modules belonging to the spare group Y00, a flash memory module P04 is selected for the replace with the flash memory module P01 (S3503).

Figure 37:
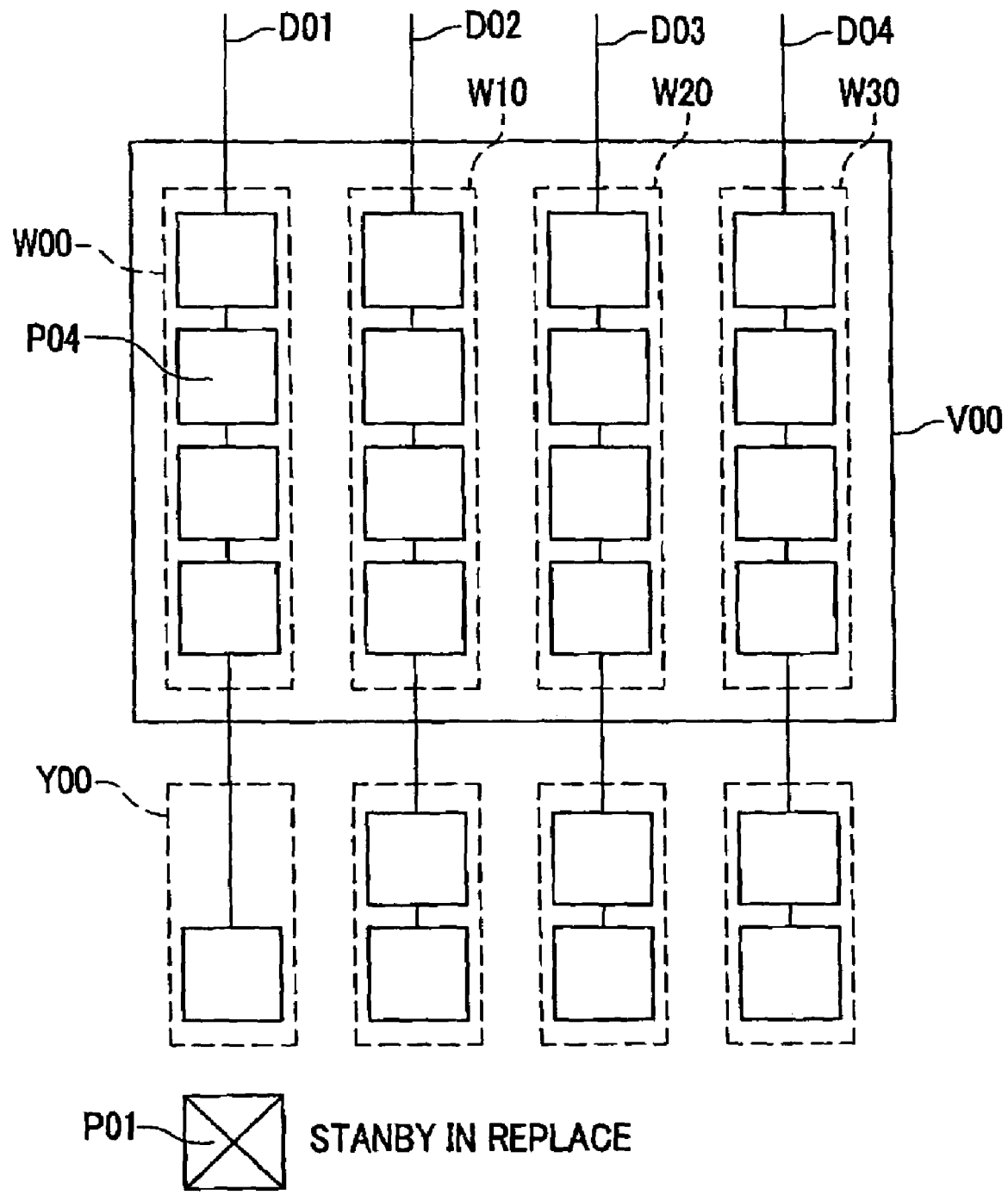
FIG. 37 is a block diagram for explaining a status after the flash memory module replace.

FIG. 37 is a block diagram for explaining a status after the flash memory module replace. As shown in FIG. 37, the flash memory module P01 is replaced with the flash memory module P04 between the wear-leveling group W00 and the spare group Y00. The module P01 in failure stays on standby in replace.

Figure 38:
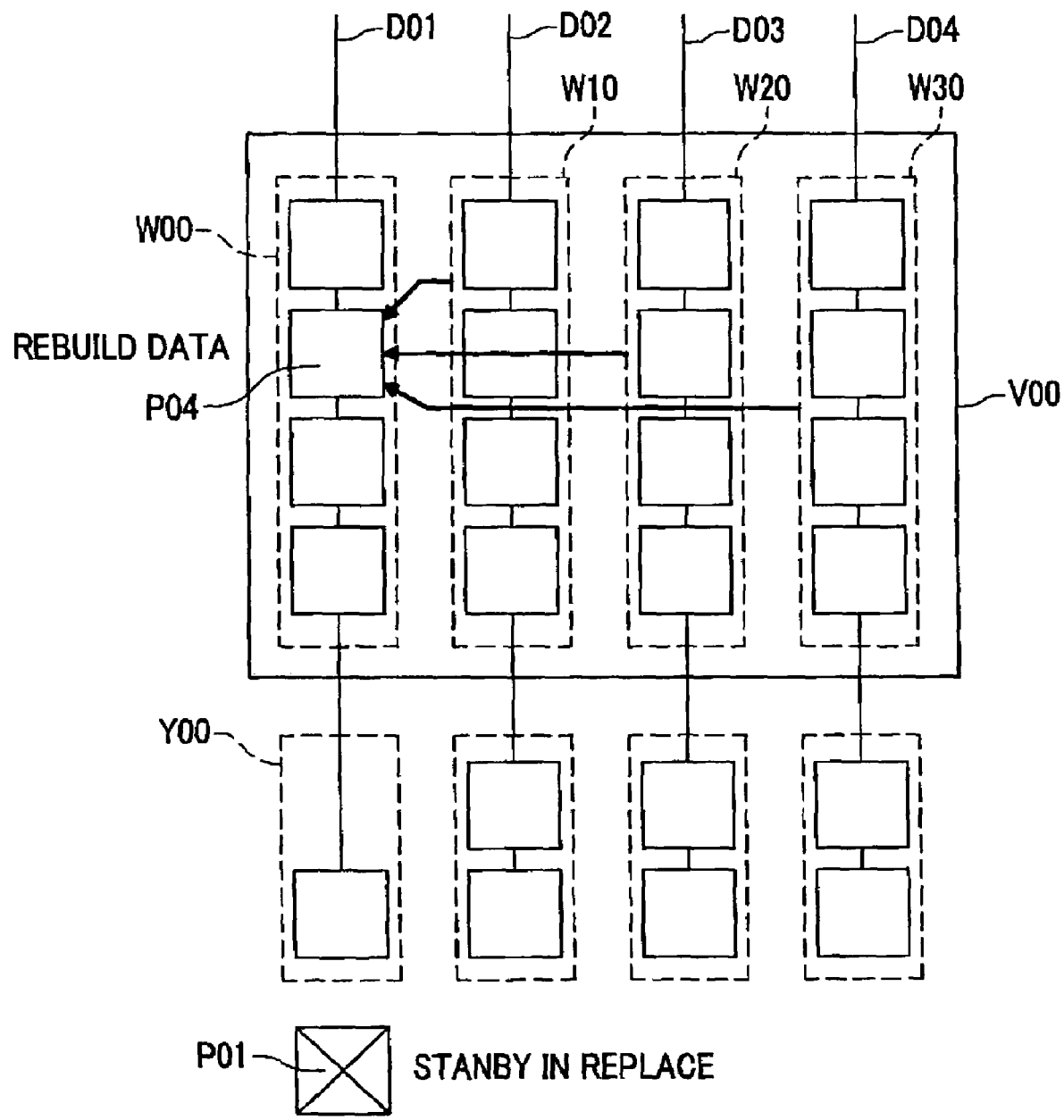
FIG. 38 is a block diagram showing how to rebuild data after the flash memory module replace.

Next, FIG. 38 is a block diagram showing how to rebuild data after the flash memory replace. As shown in FIG. 38, data written on the flash memory module P01 is rebuilt and written onto the flash memory module P04 which has been newly incorporated in the wear-leveling group W00 (S3504). Note that, at this time, data to be used for data rebuilding is stored and distributed among flash memory modules in different wear-leveling groups due to the wear-leveling. In other words, the data rebuilding is carried out on data stored in different wear-leveling groups in the same virtual page addresses.

Figure 39:
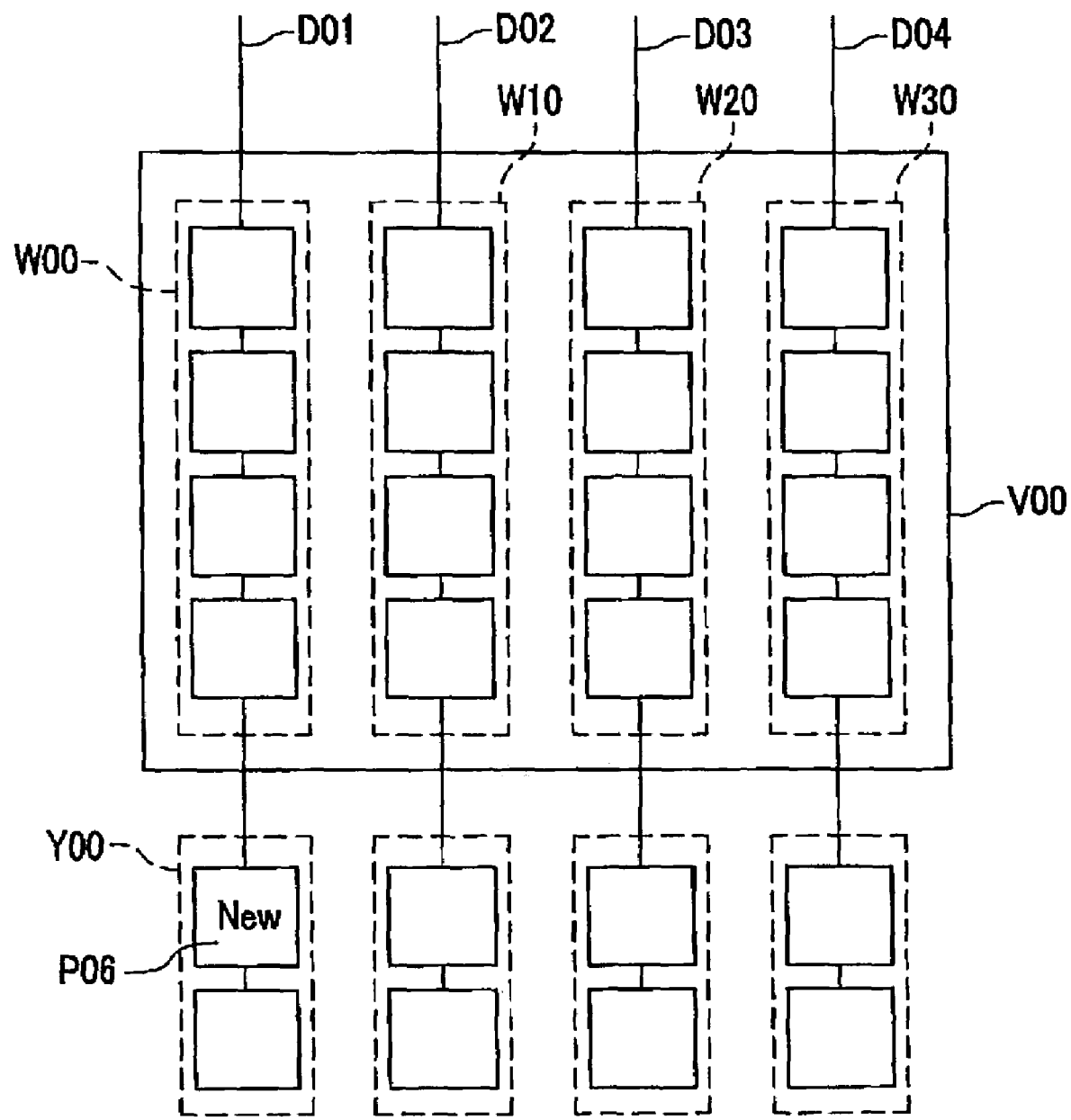
FIG. 39 is a block diagram showing a case in which a flash memory module in a spare group is replaced with a new module.

FIG. 39 is a block diagram showing a case in which a flash memory module in a spare group is replaced with a new flash memory module. As shown in FIG. 39, the flash memory module P01 on standby in replace is replaced with a new flash memory module P06, and the module P06 is incorporated in the spare group Y00 (S3505). Then, the flash memory module replace is completed.

It is determined whether or not the wear-leveling process can be performed immediately after the module replace, depending on a total write size of old module before the module replace. Note that the new placed module has no total write size over the entire area of the related logical page address areas except for some writing accompanied by the data rebuilding, therefore it is impossible to know a write frequency of each predetermined area of the logical page address area. The total write size of the old module before the module replace can be used to learn a write frequency of the logical page address area, so that the wear-leveling process can be performed.

The present invention provides a method of providing wear-leveling among plural flash memory modules, which is applicable to a purpose of increasing in flash memory module endurance, specifically, to a storage system using bulk flash memory with plural flash memory modules; a wear-leveling method therefor; and wear-leveling program for executing the above method.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A storage system using flash memories comprising a storage controller and plural flash memory modules as storage media, each flash memory module comprising at least one flash memory chip, and a memory controller for leveling erase counts of blocks belonging to the flash memory chip, the storage controller:

combining the plural flash memory modules into a first logical group, translating a first address used for accessing the flash memory modules belonging to the first logical group to a second address used for handling the first address in the storage controller, and combining a plurality of first logical groups into a second logical group.

2. The storage system using flash memories according to claim 1, wherein the second logical group includes redundant information to be used for rebuilding recorded data when a failure occurs on any of the flash memory modules.

3. The storage system using flash memories according to claim 1, wherein the second logical group is a logical group either on RAID level 0, RAID level 1, RAID level 1+0, RAID level 3, RAID level 5 or RAID level 6, and an equal capacity is provided for each of the first logical groups constituting the second logical group.

4. The storage system using flash memories according to claim 1,
wherein
a first value is a quotient yielded by dividing a product of effective write speed per flash memory module during the storage system operation and storage system endurance by flash memory endurance;

a second value is a quotient yielded by dividing a product of sustained write speed per flash memory module and storage system endurance by flash memory endurance; and the capacity of the first logical group is set to be not less than the first value and not more than the second value.

5. The storage system using flash memories according to claim 2, wherein a first value is a quotient yielded by dividing a product of effective write speed per flash memory module during the storage system operation and storage system endurance by flash memory endurance;

a second value is a quotient yielded by dividing a product of sustained write speed per flash memory module and storage system endurance by flash memory endurance; and the capacity of the first logical group is set to be not less than the first value and not more than the second value.

6. The storage system using flash memories according to claim 1 wherein the second logical group is a logical group either on RAID level 2 or RAID level 4; and in the first logical groups constituting the second group, if the number of the first logical groups for storing redundant information is m, and the number of the first logical groups for storing data is "n", capacity of the first logical group for storing redundant information is set to be at least one time and not more than "n/m" times as much as that of the first logical group for storing data.

7. The storage system using flash memories according to claim 2 wherein the second logical group is a logical group either on RAID level 2 or RAID level 4; and in the first logical groups constituting the second group, if the number of the first logical groups for storing redundant information is m, and the number of the first logical groups for storing data is "n", capacity of the first logical group for storing redundant information is set to be at least one time and not more than "n/m" times as much as that of the first logical group for storing data.

8. The storage system using flash memories according to claim 1, wherein memory area accessed via the first address is set to be larger than memory area accessed via the second address.

9. The storage system using flash memories according to claim 2, wherein memory area accessed via the first address is set to be larger than memory area accessed via the second address.

10. The storage system using flash memories according to claim 1, wherein the storage controller stores mapping information between the first address and the second address of each flash memory module, and an average erase count of blocks in each flash memory module.

11. The storage system using flash memories according to claim 2, wherein the storage controller stores mapping information between the first address and the second address of each flash memory module, and an average erase count of blocks in each flash memory module.

12. The storage system using flash memories according to claim 1, wherein the storage controller constitutes a plurality of the second logical groups.

13. The storage system using flash memories according to claim 2, wherein the storage controller constitutes a plurality of the second logical groups.

14. The storage system using flash memories according to claim 1, wherein the storage controller constitutes a plurality of second logical groups on different RAID levels.

15. The storage system using flash memories according to claim 2, wherein the storage controller constitutes a plurality of second logical groups on different RAID levels.

16. The storage system using flash memories according to claim 1, wherein the storage controller determines whether or not the storage media is flash memories when the storage system is activated or the storage media is connected with the storage system.

17. The storage system using flash memories according to claim 2, wherein the storage controller determines whether or not the storage media is flash memories when the storage system is activated or the storage media is connected with the storage system.

18. A wear-leveling method for a storage system using flash memories comprising:

flash memory modules including at least one flash memory chip and a memory controller for leveling erase counts of blocks belonging to the flash memory chip; and a storage controller for combining the flash memory modules into a first logical group, translating a first address used for accessing the flash memory modules belonging to the first logical group to a second address used for handling the first address in the storage controller, and combining a plurality of first logical groups into a second logical group, the method comprising:

a step of allowing the storage controller to provide count management on write size of each predetermined memory area in the flash memory module;

a step of allowing the storage controller to calculate an average erase count yielded by dividing total write size of each flash memory module through a predetermined time period by a capacity of the flash memory module; and a first determination step of allowing the storage controller to determine whether or not a difference between a maximum value and a minimum value of the average erase count is not less than a predetermined value, wherein at the first step, if the difference of the average erase count is not less than the predetermined value, the method further comprises a step of allowing the storage controller to exchange data between memory area having a maximum write size and memory area having a minimum write size, among the flash memory modules having the maximum difference of the average erase count, and to change mapping information between the first address and the second address.

19. The wear-leveling method for a storage system using flash memories according to claim 18 further comprising:

a second determination step of allowing the storage controller to determine whether or not there are plural flash memory modules of which data has not been exchanged after performing the data exchange step, wherein at the second determination step, if it is determined that there are plural flash memory modules of which data has not been exchanged, the method further comprises a step of allowing the storage controller to return to the first determination step.

20. The wear-leveling method for a storage system using flash memories according to claim 18, wherein
if total write size of each first logical group reaches a predetermined value, the storage controller performs the first determination step.

21. The wear-leveling method for a storage system using flash memories according to claim 19, wherein
if total write size of each first logical group reaches a predetermined value, the storage controller performs the first determination step.

22. The wear-leveling method for a storage system using flash memories according to claim 18, wherein
memory area of the first address is set to be larger than that of the second address, and
the data exchange step includes a step of exchanging data by overwriting data in the memory area of the first address.

23. The wear-leveling method for a storage system using flash memories according to claim 19, wherein
memory area of the first address is set to be larger than that of the second address, and
the data exchange step includes a step of exchanging data by overwriting data in the memory area of the first address.

24. The wear-leveling method for a storage system using flash memories according to claim 20, wherein
memory area of the first address is set to be larger than that of the second address, and
the data exchange step includes a step of exchanging data by overwriting data in the memory area of the first address.

25. The wear-leveling method for a storage system using flash memories according to claim 18, wherein there is provided, for the flash memory module, free area in the same size as transferring data at which the memory controller can transfer at a time for each predetermined memory area in the flash memory module, for which count management on the write size is provided.

26. The wear-leveling method for a storage system using flash memories according to claim 18, wherein there is provided, for the flash memory module, free area in the same size as the predetermined memory area in the flash memory module, for which count management on the write size is provided.

27. The wear-leveling method for a storage system using flash memories according to claim 18, wherein
if the flash memory module is replaced with a new flash memory module,
the write size of each predetermined memory area in the previous flash memory module, for which count management is provided, is set as write size of each predetermined memory area in the new replaced flash memory module.

28. A wear-leveling method for a storage system using flash memories comprising:
flash memory modules including at least one flash memory chip and a memory controller for leveling erase counts of blocks belonging to the flash memory chip; and
a storage controller for
combining the flash memory modules into a first logical group,
translating a first address used for accessing the flash memory modules belonging to the first logical group to a second address used for handling the first address in the storage controller, and
combining a plurality of the first logical groups into a second logical group,
the method comprising:
a step of allowing the storage controller to provide count management on write size of each predetermined memory area in the flash memory module;
a step of allowing the storage controller to calculate an average erase count for each flash memory module, by adding a first average erase count at a predetermined time to a second average erase count yielded by dividing total write size since the predetermined time by capacity of the flash memory module;
a first determination step of allowing the storage controller to determine whether or not a difference between a maximum value and a minimum value of the average erase count is not less than the predetermined value,
wherein
at the first step, if it is determined that the difference is not less than the predetermined value, the method further comprises a step of allowing the storage controller to exchange data between memory area having maximum write size and memory area having minimum write size, among the flash memory modules having the maximum difference of the erase count, and to change mapping information between the first address and the second address.

29. The wear-leveling method for a storage system using flash memories according to claim 28 further comprising a step of allowing the storage controller to replace the first average erase count with the second average erase count.

30. A computer-readable medium having stored thereon a wear-leveling program for a storage system using flash memories comprising:
flash memory modules including at least one flash memory chip and a memory controller for leveling erase counts of blocks belonging to the flash memory chip; and
a storage controller for:
combining the plural flash memory modules into a first logical group,
translating a first address used for accessing the flash memory modules belonging into the first logical group to a second address used for handling the first address in the storage controller, and
combining a plurality of first logical groups into a second logical group,
the program performing:
a process for allowing a computer to provide count management on write size of each predetermined memory area in the flash memory module;
a process for allowing the computer to calculate an average erase count yielded by dividing total write size of each flash memory module through a predetermined time period by capacity of the flash memory module;
a process of a first determination for the computer to determines whether or not a difference between a maximum value and a minimum value of the average erase count is not less than a predetermined value,
wherein
at the first determination, if the difference is not less than a predetermined value, the program further comprises a process for allowing the computer to change mapping information between the first address and the second address.

31. The computer-readable medium having stored thereon a wear-leveling program for a storage system using flash memories according to claim 30 further comprising:

a process of a second determination for allowing the computer to determine whether or not there are plural flash memory modules of which data is not exchanged after the data exchange step, wherein at the second determination process, if it is determined that there are plural flash memory modules of which data has not been exchanged, the program further comprises a process for allowing the computer to return to the first determination process.

* * * * *